United States Patent
Kamiyoshi et al.

(10) Patent No.: US 8,648,010 B2
(45) Date of Patent: Feb. 11, 2014

(54) THERMAL TRANSFER IMAGE-RECEIVING SHEETS

(75) Inventors: Nobumichi Kamiyoshi, Wakayama (JP); Takashi Mukai, Wakayama (JP); Yoshiaki Ban, Wakayama (JP); Yuuta Matsumoto, Wakayama (JP)

(73) Assignee: Kao Corporation, Tokyo (JP)

( * ) Notice: Subject to any disclaimer, the term of this patent is extended or adjusted under 35 U.S.C. 154(b) by 50 days.

(21) Appl. No.: 13/517,444

(22) PCT Filed: Dec. 22, 2010

(86) PCT No.: PCT/JP2010/073863
§ 371 (c)(1),
(2), (4) Date: Jun. 20, 2012

(87) PCT Pub. No.: WO2011/078409
PCT Pub. Date: Jun. 30, 2011

(65) Prior Publication Data
US 2012/0269992 A1    Oct. 25, 2012

(30) Foreign Application Priority Data

| Dec. 25, 2009 | (JP) | 2009-296131 |
| Jun. 4, 2010 | (JP) | 2010-129402 |
| Jun. 4, 2010 | (JP) | 2010-129407 |
| Oct. 14, 2010 | (JP) | 2010-231787 |

(51) Int. Cl.
*B41M 5/50* (2006.01)

(52) U.S. Cl.
USPC ........................................ 503/227; 427/146

(58) Field of Classification Search
USPC .............. 427/146; 428/32.39–32.51; 503/227
See application file for complete search history.

(56) References Cited

U.S. PATENT DOCUMENTS

| 6,214,458 B1 | 4/2001 | Kobayashi et al. |
| 2005/0104951 A1 | 5/2005 | Mitsuyasu et al. |
| 2010/0028569 A1 | 2/2010 | Kamiyoshi et al. |
| 2010/0139013 A1 | 6/2010 | Ban et al. |

FOREIGN PATENT DOCUMENTS

| EP | 1 518 702 | 3/2005 |
| JP | 3 101993 | 4/1991 |
| JP | 4 319489 | 11/1992 |
| JP | 8 20636 | 1/1996 |
| JP | 9 67432 | 3/1997 |
| JP | 10 60063 | 3/1998 |
| JP | 10 239903 | 9/1998 |
| JP | 11 133668 | 5/1999 |
| JP | 2009 73171 | 4/2009 |
| JP | 2009 262337 | 11/2009 |
| WO | 2006 057192 | 6/2006 |

OTHER PUBLICATIONS

International Search Report Issued Apr. 13, 2011 in PCT/JP10/73863 Filed Dec. 22, 2010.
U.S. Appl. No. 13/517,446, filed Jun. 20, 2012, Matsumoto, et al.

*Primary Examiner* — Bruce H Hess
(74) *Attorney, Agent, or Firm* — Oblon, Spivak, McClelland, Maier & Neustadt, L.L.P.

(57) ABSTRACT

The present invention relates to a thermal transfer image-receiving sheet including a dye receiving layer which contains a resin (A) including a graft polymer containing a main chain segment (A1) formed of a polyester resin having an acid value of from 5 to 40 mgKOH/g and a side chain segment (A2) formed of an addition polymer-based resin, wherein the segment (A1) is obtained by polycondensing an alcohol component containing an alkyleneoxide adduct of 2,2-bis(4-hydroxyphenyl)propane in an amount of 60 mol % or more with a carboxylic acid component, and the segment (A2) contains a constitutional unit derived from an aromatic group-containing addition-polymerizable monomer in an amount of 85% by weight or more.

15 Claims, No Drawings

THERMAL TRANSFER IMAGE-RECEIVING SHEETS

TECHNICAL FIELD

The present invention relates to a thermal transfer image-receiving sheet and a method for producing thereof.

BACKGROUND ART

There has been proposed the method for forming color images on a thermal transfer image-receiving sheet which is dyeable with a sublimation dye by using a thermal transfer sheet composed of the sublimation dye as a recording agent and a substrate on which the sublimation dye is supported. In this method, the dye is heated using a thermal head of a printer as a heating means and transferred on the image-receiving sheet to obtain the color images. The thus formed images are very clear and excellent in transparency because of the dye used, and are therefore expected to provide high-quality images which are excellent in reproducibility of half tones and gradation. For this reason, thermal transfer image-receiving sheets capable of exhibiting the above properties have been developed, and a polyester resin has been used as a dye receiving layer thereof.

Patent Literature (hereinafter referred to as PTL) 1 discloses a coloring matter receiving material for thermal sublimation printing which includes a coloring matter receiving layer containing a graft polymer composed of an unsaturated copolyester as a backbone and a vinyl copolymer as a superstrate, and a substrate, for the purpose of improving color density, clarity and sharpness of images, stability of images and adhesion to a coloring matter donating material.

PTL 2 discloses a polyester-based resin containing, as a main component, a graft polymer product having a glass transition temperature of 25° C. or higher and a molecular weight of from 0.15 to 1.5 in terms of a reduced viscosity which is in the form of a polymer composed of an unsaturated bond-containing polyester as a main chain and a polymer obtained from a radical polymerizable unsaturated monomer as a side chain, and a sublimation transfer image receptor having a dyeable layer composed mainly of a dyeable resin containing the polyester-based resin, for the purpose of improving an image-forming sensitivity.

PTL 3 discloses a polyester-based resin containing, as a main component, a graft polymer product having a tan δ peak temperature of 40° C. or higher and a glass transition temperature of 15° C. or higher, and a molecular weight of from 0.15 to 1.5 in terms of a reduced viscosity which is in the form of a polymer composed of an unsaturated bond-containing polyester as a main chain and a polymer obtained from a radical polymerizable unsaturated monomer as a side chain, and a sublimation transfer image receptor having a dyeable layer composed mainly of a dyeable resin containing the polyester-based resin, for the purpose of improving dyeing sensitivity, durability of images and storage stability.

PTL 4 discloses a thermal transfer image-receiving sheet which includes a substrate and a dye receiving layer formed on the substrate which contains a graft polymer composed of at least one monomer selected from an acrylic monomer and a methacrylic monomer and at least one polyester, for the purpose of improving a printing density, adhesion of the laminated film, bleeding and discoloration of images and traveling stability.

PTL 5 discloses a receiving layer composition for thermal transfer image-receiving sheets which includes a resin containing a polyester obtained by polycondensing an alcohol component containing an alkyleneoxide adduct of bisphenol A in an amount of 50 mol % or more and a carboxylic acid component containing an alicyclic carboxylic acid in an amount of more than 50 mol %, and a polyether-modified silicone having an oxyethylene group and/or an oxypropylene group, for the purpose of improving dyeability and releasability.

PTL 6 discloses a dye receiving layer composition for thermal transfer image-receiving sheets which includes a resin containing a polyester obtained by using an alcohol component containing an alkyleneoxide adduct of 2,2-bis(4-hydroxyphenyl)propane in an amount of 50 mol % or more, and an oxazoline group-containing compound, for the purposes of improving dyeability with dyes and releasability from a transfer sheet and attaining an excellent transfer image performance.

PTL 7 discloses a thermal transfer image-receiving material which includes a substrate and at least one image-receiving layer formed on the substrate which receives a coloring matter transferred from a thermal transfer coloring matter donating material upon heating to form an image thereon and which is formed of a composition prepared by dispersing a coloring matter receiving substance in a water-soluble binder, wherein an uppermost layer of image-receiving surface-forming layers of the image-receiving material contains a co-dispersed material composed of a silicone compound and a plasticizer having an [organic/inorganic] ratio of 1.5 or more, for the purpose of improving film properties and a transferred image density.

CITATION LIST

Patent Literature

[PTL 1]
JP-A 4-319489 ("JP-A" means unexamined published Japanese patent publication)
[PTL 2]
JP-A 9-67432
[PTL 3]
JP-A 10-60063
[PTL 4]
WO 2006/057192
[PTL 5]
JP-A 2009-262337
[PTL 6]
JP-A 2009-73171
[PTL 7]
JP-A 3-101993

SUMMARY OF INVENTION

Technical Problem

The above thermal transfer printing is carried out by heating a thermal head to transfer a dye from an ink sheet to a thermal transfer image-receiving sheet such that the thermal transfer image-receiving sheet is colored with the transferred dye. For this reason, in order to exhibit an aimed color on the thermal transfer image-receiving sheet, it is required that the sheet has a high dyeability with dyes. Therefore, there tends to occur such a problem that the ink sheet and the thermal transfer image-receiving sheet are fused together upon the coloring. In particular, the thermal transfer image-receiving sheet preserved under high-temperature and high-humidity conditions tends to have a remarkable problem of fusion to the ink sheet. In consequence, there is a demand for thermal transfer image-receiving sheets having a high dyeability with dyes, and an excellent releasability capable of suppressing fusion to the ink sheet.

In addition, the conventional thermal transfer image-receiving sheets tend to have such a problem that the obtained print suffers from discoloration with time. Therefore, there is also a demand for thermal transfer image-receiving sheets having not only a high dyeability with dyes but also an excellent light fastness capable of suppressing the discoloration of a print.

The thermal transfer image-receiving sheets described in the above PTLs 1 to 7 are still unsatisfactory and should be further improved in their properties from the viewpoints of satisfying both of the dyeability and releasability or both of the dyeability and light fastness.

The present invention relates to a thermal transfer image-receiving sheet which is excellent in releasability, in particular, releasability under high-temperature and high-humidity conditions, and dyeability, and to a process for producing the thermal transfer image-receiving sheet.

Also, the present invention relates to a thermal transfer image-receiving sheet which is excellent in dyeability and light fastness, and to a process for producing the thermal transfer image-receiving sheet.

Solution to Problem

The present inventors have considered that the condition of the dye receiving layer upon heated by a thermal head has a significant influence on releasability, in particular, releasability under high-temperature and high-humidity conditions, dyeability and light fastness of the thermal transfer image-receiving sheet, and therefore have made intense studies and researches thereon. As a result, it has been found that the dyeability and releasability of the thermal transfer image-receiving sheet can be improved by using a resin containing a graft polymer having a main chain segment composed of a specific polyester resin and a side chain segment composed of an addition polymer-based resin in the dye receiving layer.

That is, the present invention relates to the following aspects [1] and [2].

[1] A thermal transfer image-receiving sheet comprising a dye receiving layer which comprises a resin (A) including a graft polymer containing a main chain segment (A1) formed of a polyester resin having an acid value of from 5 to 40 mgKOH/g and a side chain segment (A2) formed of an addition polymer-based resin, wherein the segment (A1) is obtained by polycondensing an alcohol component containing an alkyleneoxide adduct of 2,2-bis(4-hydroxyphenyl)propane in an amount of 60 mol % or more with a carboxylic acid component, and the segment (A2) contains a constitutional unit derived from an aromatic group-containing addition-polymerizable monomer in an amount of 85% by weight or more.

[2] A method for producing the thermal transfer image-receiving sheet as described in the above aspect [1], comprising:

preparing a dye receiving layer coating solution by a process including the following steps (1) and (2); and forming the dye receiving layer using the dye receiving layer coating solution, Step (1): polycondensing the alcohol component containing an alkyleneoxide adduct of 2,2-bis(4-hydroxyphenyl) propane in an amount of 60 mol % or more with the carboxylic acid component to prepare a polyester resin (a1) containing a non-aromatic carbon-to-carbon unsaturated bond and having an acid value of from 5 to 40 mgKOH/g, and then mixing the polyester resin (a1) with an aqueous medium to obtain an aqueous dispersion of the polyester resin (a1); and Step (2): adding an addition-polymerizable monomer (a2) to the aqueous dispersion obtained in the above step (1) to polymerize the monomer (a2) with the polyester resin (a1), thereby obtaining an aqueous dispersion of the graft polymer.

Advantageous Effects of Invention

The thermal transfer image-receiving sheet of the present invention satisfies both an excellent releasability, in particular, releasability under high-temperature and high-humidity conditions and an excellent dyeability. Thus, the thermal transfer image-receiving sheet of the present invention can form images having a high color density, and hardly suffers from heat fusion to an ink sheet upon printing.

In addition, the thermal transfer image-receiving sheet of the present invention can also satisfy both an excellent dyeability and an excellent light fastness.

DESCRIPTION OF EMBODIMENTS

The thermal transfer image-receiving sheet of the present invention includes a dye receiving layer which contains a resin (A) (hereinafter occasionally referred to as a "resin (A) for thermal transfer image-receiving sheets") including a graft polymer containing a main chain segment (A1) formed of a polyester resin having an acid value of from 5 to 40 mgKOH/g (hereinafter occasionally referred to merely as a "segment (A1)") and a side chain segment (A2) formed of an addition polymer-based resin (hereinafter occasionally referred to merely as a "segment (A2)"), wherein the segment (A1) is obtained by polycondensing an alcohol component containing an alkyleneoxide adduct of 2,2-bis(4-hydroxyphenyl)propane (bisphenol A) in an amount of 60 mol % or more with a carboxylic acid component, and the segment (A2) contains a constitutional unit derived from an aromatic group-containing addition-polymerizable monomer in an amount of 85% by weight or more.

The reason why the thermal transfer image-receiving sheet of the present invention is excellent in releasability, in particular, releasability under high-temperature and high-humidity conditions and dyeability, is considered as follows, although not clearly determined.

The monomers for the segment (A1) in the graft polymer contained in the dye receiving layer of the thermal transfer image-receiving sheet of the present invention include an alkyleneoxide adduct of 2,2-bis(4-hydroxyphenyl)propane as the alcohol component. The compound has two aromatic rings derived from 2,2-bis(4-hydroxyphenyl)propane in a molecule thereof, i.e., has a structure similar to dyes, and therefore exhibits a high affinity with dyes, which is considered to contribute to improvement in dyeability of the thermal transfer image-receiving sheet. In addition, the compound is rigid and has a structure having a low affinity with water, and therefore forms a hard resin, which is considered to contribute to improvement in releasability, in particular, releasability under high-temperature and high-humidity conditions.

Also, the segment (A2) in the graft polymer is hardly compatible with the main chain segment (A1) formed of the polyester resin having the above structure, so that the graft polymer has a fine phase separation structure. As a result, the dyes are enhanced in penetration into the dye receiving layer from an interface of its phase separation structure, whereas portions having a poor affinity with the ink sheet are distributed over the surface of the dye receiving layer, which is considered to improve dyeability and releasability of the thermal transfer image-receiving sheet to a large extent.

In addition, in the present invention, the segment (A1) has an acid value of from 5 to 40 mgKOH/g. Thus, it is considered that a small amount of a carboxyl group contained in the segment (A1) allows the segment (A1) of the polyester resin having the above rigid structure which is poor in dispersibility and the segment (A2) of the addition polymer-based resin to be uniformly dispersed in a liquid, so that the resulting dye receiving layer has a smooth surface. This will result in a good effect that the obtained thermal transfer image-receiving sheet is improved in releasability, in particular, releasability under high-temperature and high-humidity conditions, and dyeability.

[Resin (A) for Thermal Transfer Image-Receiving Sheets]

The resin (A) for thermal transfer image-receiving sheets used in the present invention includes a graft polymer containing a main chain segment (A1) formed of a polyester resin having an acid value of from 5 to 40 mgKOH/g and a side chain segment (A2) formed of an addition polymer-based resin. The content of the graft polymer in the resin (A) for thermal transfer image-receiving sheets used in the present invention is preferably from 80 to 100 mol %, more preferably from 90 to 100 mol % and further preferably substantially 100 mol %.

(Main Chain Segment (A1) Formed of Polyester Resin)

The segment (A) constituting the graft polymer is a segment formed of a polyester resin having an acid value of from 5 to 40 mgKOH/g which is obtained by polycondensing an alcohol component containing an alkyleneoxide adduct of 2,2-bis(4-hydroxyphenyl)propane in an amount of 60 mol % or more with a carboxylic acid component. The segment (A1) is a main chain of the graft polymer.

The alkyleneoxide adduct of 2,2-bis(4-hydroxyphenyl) propane is preferably a compound specifically represented by the following formula (I):

[Chem. 1]

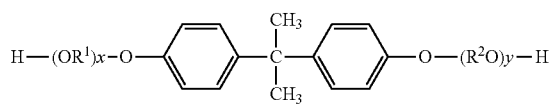

(I)

In the formula (I), $R^1O$ and $R^2O$ are respectively an oxyalkylene group, preferably each independently an oxyalkylene group having 1 to 4 carbon atoms, and more preferably an oxyethylene group or an oxypropylene group.

The suffixes x and y each correspond to a molar number of addition of alkyleneoxides and are respectively a positive number. In addition, from the viewpoint of a good reactivity with the carboxylic acid component, a sum of x and y is preferably from 2 to 7, more preferably from 2 to 5 and further preferably from 2 to 3 on the average.

Also, the $R^1O$ groups in the number of x and the $R^2O$ groups in the number of y may be respectively the same or different. From the viewpoints of dyeability of the thermal transfer image-receiving sheet with dyes and adhesion between an intermediate layer and the dye receiving layer, the $R^1O$ groups and the $R^2O$ groups are preferably respectively identical to each other, and more preferably both are an oxypropylene group. These alkyleneoxide adducts of 2,2-bis (4-hydroxyphenyl)propane may be used alone or in combination of any two or more thereof.

The content of the oxypropylene group in the oxyalkylene groups is preferably from 50 to 100 mol %, more preferably from 60 to 100 mol %, further preferably from 70 to 100 mol % and furthermore preferably substantially 100 mol % from the viewpoints of a good releasability of the thermal transfer image-receiving sheet, in particular, a good releasability under high-temperature and high-humidity conditions, and a good dyeability. As the other oxyalkylene group, from the viewpoint of a good dyeability of the thermal transfer image-receiving sheet, preferred are an oxyethylene group and an oxytrimethylene group, and from the same viewpoint, more preferred is an oxyethylene group.

The content of the alkyleneoxide adduct of 2,2-bis(4-hydroxyphenyl)propane in the alcohol component is 60 mol % or more, preferably 70 mol % or more, more preferably 80 mol % or more, and further preferably substantially 100 mol % from the viewpoints of a good releasability and a good dyeability of the thermal transfer image-receiving sheet. Meanwhile, the "alkyleneoxide adduct" as used herein means a whole of a structure formed by adding an oxyalkylene group to 2,2-bis(4-hydroxyphenyl)propane.

The alcohol component used as the monomer for the segment (A1) may also contain, in addition to the alkyleneoxide adduct of 2,2-bis(4-hydroxyphenyl)propane, other alcohol components.

More specifically, as the monomer from which the constitutional unit of the segment (A1) is derived (hereinafter also referred to merely as the "monomer for the segment (A1)"), there are preferably used alcohol components containing an alcohol having a non-aromatic carbon-to-carbon unsaturated bond, for example, an unsaturated aliphatic alcohol. The moiety of the non-aromatic carbon-to-carbon unsaturated bond of the unsaturated aliphatic alcohol may act as a portion bonding to the segment (A2) in the graft polymer. In such a case, the unsaturated bond of the alcohol is converted into a saturated bond in the graft polymer. Examples of the alcohol having a non-aromatic carbon-to-carbon unsaturated bond (unsaturated aliphatic alcohol) include allyl alcohol and the like.

Examples of the other alcohol components include ethylene glycol, propylene glycol (1,2-propanediol), glycerol, pentaerythritol, trimethylol propane, hydrogenated bisphenol A, sorbitol, and alkylene ($C_2$ to $C_4$) oxide adducts (average molar number of addition: 1 to 16) of these compounds. These alcohol components may be used alone or in combination of any two or more thereof.

In the segment (A1) as the polyester resin, the carboxylic acid component is used as the monomer in addition to the above alcohol component.

The carboxylic acid component as the monomer for the segment (A1) preferably contains a carboxylic acid having a non-aromatic carbon-to-carbon unsaturated bond, such as an unsaturated aliphatic carboxylic acid and/or an unsaturated alicyclic carboxylic acid. The moiety of the non-aromatic carbon-to-carbon unsaturated bond preferably acts as a portion bonding to the segment (A2) in the graft polymer. In such a case, the unsaturated bond of the carboxylic acid is converted into a saturated bond in the graft polymer.

Examples of the carboxylic acid having a non-aromatic carbon-to-carbon unsaturated bond (an unsaturated aliphatic carboxylic acid and/or an unsaturated alicyclic carboxylic acid) include unsaturated aliphatic carboxylic acids such as fumaric acid, maleic acid, acrylic acid and methacrylic acid; and unsaturated alicyclic carboxylic acids such as tetrahydrophthalic acid. From the viewpoint of a good reactivity, among these carboxylic acids, preferred are fumaric acid, maleic acid and tetrahydrophthalic acid, and more preferred is fumaric acid.

The content of the carboxylic acid having a non-aromatic carbon-to-carbon unsaturated bond in the carboxylic acid component is preferably from 5 to 30 mol %, more preferably from 7 to 25 mol % and further preferably from 8 to 15 mol %.

Examples of the other carboxylic acid which may be used in the carboxylic acid component include aromatic dicarboxylic acids such as phthalic acid, isophthalic acid and terephthalic acid; aliphatic dicarboxylic acids such as adipic acid, succinic acid and succinic acids containing an alkyl group and/or an alkenyl group; alicyclic dicarboxylic acids such as cyclohexanedicarboxylic acid and decalindicarboxylic acid; trivalent or higher-valent polycarboxylic acids such as trimellitic acid and pyromellitic acid; and anhydrides and alkyl ($C_1$ to $C_3$) esters of these acids. From the viewpoints of a good dyeability of the thermal transfer image-receiving sheet, among these other carboxylic acids, preferred are aromatic dicarboxylic acids and alicyclic dicarboxylic acids, and more preferred are cyclohexanedicarboxylic acid and isophthalic acid. In addition, among these dicarboxylic acids, preferred are aromatic dicarboxylic acids, and more preferred is isophthalic acid. These carboxylic acids may be contained alone or in combination of any two or more thereof in the carboxylic acid component.

Meanwhile, among the monomers from which the constitutional unit of the main chain segment (A1) formed of the polyester resin is derived, the monomer having a non-aromatic carbon-to-carbon unsaturated bond may contain at least one selected from the group consisting of an unsaturated aliphatic carboxylic acid, an unsaturated alicyclic carboxylic acid and an unsaturated aliphatic alcohol. From the viewpoint of a good reactivity, the monomer preferably contains an unsaturated aliphatic carboxylic acid and/or an unsaturated alicyclic carboxylic acid, and more preferably the monomer essentially consists of an unsaturated aliphatic carboxylic acid and/or an unsaturated alicyclic carboxylic acid only.

From the viewpoints of releasability and storage stability of the thermal transfer image-receiving sheet, the acid value of the segment (A1) is from 5 to 40 mgKOH/g, preferably from 5 to 35 mgKOH/g, more preferably from 5 to 30 mgKOH/g and further preferably from 10 to 20 mgKOH/g.

In addition, the number-average molecular weight of the segment (A1) is preferably from 1,000 to 10,000 and more preferably from 2,000 to 8,000 from the viewpoint of a film-forming property when used in the dye receiving layer.

Meanwhile, in the present invention, the segment (A1) may be modified within the above-specified ranges to such an extent that substantially no properties thereof are adversely affected.

In the present invention, the content of a polyester moiety in the segment (A1) is preferably from 50 to 100% by weight, more preferably from 60 to 100% by weight, and further preferably substantially 100% by weight from the viewpoints of releasability, in particular, releasability under high-temperature and high-humidity conditions and dyeability of the thermal transfer image-receiving sheet.

In the present invention, the acid group contained in the segment (A1) preferably includes a carboxyl group, and the content of the carboxyl group in the whole acid groups is preferably 90 mol % or more, and more preferably substantially 100 mol %. The segment (A1) preferably contains a sulfonic group in an amount of 10 mol % or less, and more preferably contains substantially no sulfonic group. When the content of the sulfonic group becomes too large, the segment (A1) tends to have an excessively high water solubility, and as a result, tends to be deteriorated in reactivity with the monomer for the side chain segment (A2), and further tends to have a weak interaction with dyes, resulting in deterioration in dyeability and releasability of the thermal transfer image-receiving sheet as the aimed effects of the present invention.

(Side Chain Segment (A2) Formed of Addition Polymer-Based Resin)

The segment (A2) constituting the graft polymer is a segment composed of an addition polymer-based resin containing a constitutional unit derived from an addition-polymerizable monomer (a2) (hereinafter occasionally referred to merely as a "monomer (a2)"), and contains a constitutional unit derived from an aromatic group-containing addition-polymerizable monomer in an amount of 85% by weight or more. The segment (A2) serves as a side chain in the graft polymer.

Examples of the addition-polymerizable monomer (a2) usable in the present invention include styrenes such as styrene, methyl styrene, α-methyl styrene, β-methyl styrene, t-butyl styrene, chlorostyrene, chloromethyl styrene, methoxystyrene, styrenesulfonic acid and salts thereof; (meth)acrylic acid esters such as alkyl ($C_1$ to $C_{18}$) (meth)acrylates, benzyl(meth)acrylate and dimethylaminoethyl(meth)acrylate; olefins such as ethylene, propylene and butadiene; halovinyl compounds such as vinyl chloride; vinyl esters such as vinyl acetate and vinyl propionate; vinyl ethers such as vinyl methyl ether; halogenated vinylidenes such as vinylidene chloride; and N-vinyl compounds such as N-vinyl pyrrolidone.

Among these addition-polymerizable monomers, preferred are styrenes and (meth)acrylic acid esters. Among them, more preferred are aromatic group-containing addition-polymerizable monomers, and further preferred are styrene, methyl styrene, benzyl methacrylate and benzyl acrylate. In particular, among these monomers, styrene is especially preferred from the viewpoints of inexpensiveness of the monomer as well as releasability and storage stability of the resulting thermal transfer image-receiving sheet.

The content of the constitutional unit derived from the aromatic group-containing addition-polymerizable monomer in the segment (A2) is 85% by weight or more, preferably 90% by weight or more, more preferably 95% by weight or more, and further preferably substantially 100% by weight from the viewpoints of releasability, in particular, releasability under high-temperature and high-humidity conditions, and dyeability of the thermal transfer image-receiving sheet.

The weight ratio of the segment (A2) to a sum of an unsaturated carboxylic acid, an unsaturated alicyclic carboxylic acid and an unsaturated aliphatic alcohol among the monomers for the segment (A1) [segment (A2)/sum of the above unsaturated group-containing components for segment (A1)] is preferably from 1/1 to 15/1, more preferably from 1/1 to 10/1 and further preferably from 2/1 to 5/1 from the viewpoints of dyeability and releasability of the thermal transfer image-receiving sheet.

The weight ratio of the segment (A1) to the segment (A2) [segment (A1)/segment (A2)] which constitute the graft polymer is preferably from 55/45 to 95/5, more preferably from 65/35 to 95/5, further preferably from 75/25 to 95/5, and furthermore preferably from 85/15 to 95/5 from the viewpoint of enhancing dyeability of the thermal transfer image-receiving sheet.

When the segment (A1) is present in a larger amount than the segment (A2), it is considered that the graft polymer can exhibit a sufficient dyeability due to a molecular structure of the segment (A1) while forming the fine phase separation structure.

The graft polymer is preferably in the form of a crosslinked graft polymer. The content of a methyl ethyl ketone-insoluble component in the crosslinked graft polymer is preferably from 50 to 85% by weight, more preferably from 61 to 83% by weight, further preferably from 62 to 80% by weight and furthermore preferably from 67 to 77% by weight from the viewpoint of enhancing releasability and dyeability of the thermal transfer image-receiving sheet. The content of the methyl ethyl ketone-insoluble component may be determined by the method described in Examples below.

The resins containing the methyl ethyl ketone-insoluble component in the above-specified range may be produced by adjusting an amount of a crosslinking agent which serves to constitute branched and crosslinked moieties of the graft polymer, such as alcohols having a non-aromatic carbon-to-carbon unsaturated bond and carboxylic acids having a non-aromatic carbon-to-carbon unsaturated bond.

The crosslinked graft polymer contains a segment essentially consisting of an aromatic group-containing addition-polymerizable monomer and a segment essentially consisting of a polyester, and has a network structure containing a relatively large amount of the methyl ethyl ketone-insoluble component, i.e., a gel component. Since dyes are penetrated into the network structure and held therein, the resulting thermal transfer image-receiving sheet is enhanced in dyeability. Further, since the resins whose molecular weight is increased by the crosslinking are present on the surface of the sheet, the resins are hardly migrated to the ink sheet even when heat-fused upon printing, so that the releasability of the resulting sheet can be enhanced.

The rate of swelling with methyl ethyl ketone (hereinafter occasionally referred to merely as a "methyl ethyl ketone swelling rate") of the crosslinked graft polymer is preferably from 170 to 300% by weight, more preferably from 188 to 270% by weight and further preferably from 200 to 260% by weight from the viewpoint of enhancing releasability and dyeability of the thermal transfer image-receiving sheet. The methyl ethyl ketone swelling rate may be determined by the method described in Examples below.

The resins whose methyl ethyl ketone swelling rate lies within the above-specified range may be prepared by adjusting an amount of a compound constituting the branched and crosslinked moieties of the graft polymer and a molecular weight of the respective segments of the graft polymer. As the amount of the branched and crosslinked moieties is increased, the swelling rate is reduced, whereas as the molecular weight of the respective segments becomes larger, the swelling rate is increased.

From the viewpoints of releasability and storage stability of the thermal transfer image-receiving sheet, the resin (A) for thermal transfer image-receiving sheets used in the present invention preferably has a softening point of from 80 to 165° C. From the same viewpoints, the resin (A) for thermal transfer image-receiving sheets preferably has an acid value of from 5 to 40 mgKOH/g, more preferably from 5 to 35 mgKOH/g and further preferably from 10 to 35 mgKOH/g.

[Method for Producing Resin (A) for Thermal Transfer Image-Receiving Sheets]

The resin (A) for thermal transfer image-receiving sheets used in the present invention is preferably produced by the method in which an alcohol component containing an alkyleneoxide adduct of 2,2-bis(4-hydroxyphenyl)propane in an amount of 60 mol % or more is first polycondensed with a carboxylic acid component to prepare a polyester resin (a1) containing a non-aromatic carbon-to-carbon unsaturated bond and having an acid value of from 5 to 40 mgKOH/g (hereinafter occasionally referred to merely as a "resin (a1)"), and then an addition-polymerizable monomer (a2) is subjected to addition polymerization in the presence of the polyester resin (a1).

(Polyester Resin (a1))

The resin (a1) is a polyester resin containing a non-aromatic carbon-to-carbon unsaturated bond and having an acid value of from 5 to 40 mgKOH/g which is obtained by polycondensing an alcohol component containing an alkyleneoxide adduct of 2,2-bis(4-hydroxyphenyl)propane in an amount of 60 mol % or more with a carboxylic acid component. The resin (a1) is suitable for constituting the main chain segment (A1) composed of the above polyester resin. Meanwhile, the "non-aromatic carbon-to-carbon unsaturated bond" is derived from at least one selected from the group consisting of the above unsaturated aliphatic carboxylic acid, unsaturated alicyclic carboxylic acid and unsaturated aliphatic alcohol.

Thus, the resin (a1) is obtained by using the alcohol component containing an alkyleneoxide adduct of 2,2-bis(4-hydroxyphenyl)propane in an amount of 60 mol % or more as the raw material component.

The alkyleneoxide adduct of 2,2-bis(4-hydroxyphenyl) propane is the same as that used above for the segment (A1), and suitable structure and suitable content thereof are also the same as those for the segment (A1).

The alcohol component as the raw material component of the resin (a1) may also contain the other alcohols in addition to the alkyleneoxide adduct of 2,2-bis(4-hydroxyphenyl)propane. The resin (a1) has a non-aromatic carbon-to-carbon unsaturated bond, and can be obtained by using an alcohol having a non-aromatic carbon-to-carbon unsaturated bond as the alcohol component. Examples of the alcohol having a non-aromatic carbon-to-carbon unsaturated bond include unsaturated aliphatic alcohols such as allyl alcohol.

The other alcohols may be the same as those used for the segment (A1). These alcohols may be used alone or in combination of any two or more thereof.

In addition, the resin (a1) having a non-aromatic carbon-to-carbon unsaturated bond may also be suitably obtained by using a carboxylic acid having a non-aromatic carbon-to-carbon unsaturated bond as the carboxylic acid component which is a raw material component of the polyester.

The carboxylic acid having a non-aromatic carbon-to-carbon unsaturated bond may be the same as that used for the segment (A1), and suitable structure and suitable content thereof are also the same as those for the segment (A1). The carboxylic acid having a non-aromatic carbon-to-carbon unsaturated bond is preferably fumaric acid.

The content of the carboxylic acid having a non-aromatic carbon-to-carbon unsaturated bond in the carboxylic acid component is preferably from 5 to 30 mol %, more preferably from 7 to 25 mol % and further preferably from 8 to 15 mol %.

The other carboxylic acids which may be used in the carboxylic acid component may be the same as those used for the segment (A1), and suitable structure and suitable content thereof are also the same as those for the segment (A1). Among these carboxylic acids, preferred are cyclohexanedicarboxylic acid and isophthalic acid, and more preferred is isophthalic acid. These carboxylic acids may be used alone or in combination of any two or more thereof.

The polyester resin (a1) may be produced by polycondensing the above alcohol component with the above carboxylic acid component in an inert gas atmosphere at a temperature of from 180 to 250° C., if required, in the presence of an esterification catalyst.

From the viewpoint of a good releasability of the thermal transfer image-receiving sheet, the polyester preferably has a sharp molecular weight distribution and is preferably produced by the polycondensation using an esterification catalyst. Examples of the esterification catalyst include tin catalysts, titanium catalysts, and metal compounds such as antimony trioxide, zinc acetate and germanium dioxide. Among these catalysts, from the viewpoint of a high reaction efficiency of the esterification reaction upon synthesis of the polyester, preferred are tin catalysts. Examples of the preferred tin catalysts include tin dibutyl oxide, tin dioctylate and salts thereof.

In the present invention, since the carboxylic acid having a non-aromatic carbon-to-carbon unsaturated bond is used as the carboxylic acid component, a radical polymerization inhibitor is preferably used. Examples of the preferred radical polymerization inhibitor include 4-t-butyl catechol.

From the viewpoints of releasability and storage stability of the thermal transfer image-receiving sheet, the resin (a1) preferably has a softening point of from 80 to 165° C. and a glass transition temperature of from 50 to 85° C. Also, from the viewpoints of releasability and storage stability of the thermal transfer image-receiving sheet, the acid value of the resin (a1) is from 5 to 40 mgKOH/g, preferably from 5 to 35 mgKOH/g, more preferably from 5 to 30 mgKOH/g and further preferably from 10 to 20 mgKOH/g.

The desired glass transition temperature, softening point and acid value of the resin (a1) may be respectively attained by appropriately adjusting the kinds and compounding proportions of monomers used, the polycondensation temperature and the reaction time.

In addition, from the viewpoint of a good film-forming property of the resin (a1) when used in the dye receiving layer, the number-average molecular weight of the resin (a1) is preferably from 1,000 to 10,000 and more preferably from 2,000 to 8,000.

Meanwhile, in the present invention, the resin (a1) may be modified within the above-specified ranges to such an extent that substantially no properties thereof are adversely affected. Examples of the modified resin (a1) include those polyesters which are grafted or blocked with a phenol, a urethane, an epoxy group or the like, as described in JP-A 11-133668, JP-A 10-239903, JP-A 8-20636 or the like.

In the present invention, the content of a polyester moiety in the resin (a1) is preferably from 50 to 100% by weight, more preferably from 60 to 100% by weight, and further preferably substantially 100% by weight from the viewpoints of dyeability and releasability of the thermal transfer image-receiving sheet.

(Addition-Polymerizable Monomer (a2))

The addition-polymerizable monomer (a2) used in the present invention may be the same as that used as the monomer for the segment (A2) composed of the above addition polymer-based resin, and contains an aromatic group-containing addition-polymerizable monomer in an amount of 85% by weight or more, preferably 90% by weight or more, more preferably 95% by weight or more, and further preferably substantially 100% by weight. As the addition-polymerizable monomer, preferred are styrene, benzyl methacrylate and benzyl acrylate. In particular, among these monomers, styrene is especially preferred from the viewpoints of inexpensiveness of the monomer as well as releasability and storage stability of the resulting thermal transfer image-receiving sheet.

(Method for Producing Resin (A) for Thermal Transfer Image-Receiving Sheets)

The resin (A) for thermal transfer image-receiving sheets used in the present invention may be produced by the method of polymerizing the above addition-polymerizable monomer (a2) in the presence of the resin (a1). The polymerization method is not particularly limited. Examples of the polymerization method include the method of directly mixing the resin (a1) and the monomer (a2) with each other, the method of dissolving the resin (a1) and the monomer (a2) in an organic solution and then subjecting the resulting solution to polymerization reaction. The resin (A) for thermal transfer image-receiving sheets used in the present invention is preferably produced by the method including the following steps (1) and (2):

Step (1): mixing the above polyester resin (a1) with an aqueous medium to prepare an aqueous dispersion of the polyester resin (a1); and Step (2): adding the above addition-polymerizable monomer (a2) to the aqueous dispersion obtained in the above step (1) to polymerize the monomer (a2) with the resin (a1), thereby obtaining an aqueous dispersion of the resin (A) for thermal transfer image-receiving sheets.

<Step (1)>

In the step (1), the polyester resin (a1) is mixed with an aqueous medium to prepare an aqueous dispersion of the polyester resin (a1).

The aqueous medium used for dispersing the polyester resin (a1) contains water as a main component, i.e., is a medium containing water in an amount of 50% by weight or more. From the viewpoint of an environmental safety, the content of water in the aqueous medium is preferably 80% by weight or more, more preferably 90% by weight or more and further preferably substantially 100% by weight. Examples of components other than water which may be contained in the aqueous medium include water-soluble organic solvents, e.g., alcohol-based solvents such as methanol, ethanol, isopropanol and butanol; ketone-based solvents such as acetone, methyl ethyl ketone, diethyl ketone, dipropyl ketone, methyl isobutyl ketone and methyl isopropyl ketone; and ether-based solvents such as tetrahydrofuran.

As the method for dispersing the polyester resin (a1) in the aqueous medium, there is preferably used the method of dissolving the polyester resin (a1) in a ketone-based solvent, adding a the below-mentioned neutralizing agent to the resulting solution to ionize a carboxyl group of the polyester resin (a1), and then adding water to the obtained reaction solution to convert it into a water phase. More preferably, in the above method, the ketone-based solvent is distilled off after adding water to convert the reaction solution into a water phase.

More specifically, for example, using a reactor equipped with a stirrer, a reflux condenser, a thermometer, a dropping funnel and a nitrogen gas inlet tube, the polyester resin (a1) is dissolved in the ketone-based solvent, and the resulting solution is mixed with the neutralizing agent to ionize a carboxyl group of the polyester resin (if the carboxyl group is already ionized, this step is omitted), and then water is added to the obtained reaction solution to convert it into a water phase, preferably followed by distilling off the ketone-based solvent after adding water to convert the reaction solution into a water phase.

The procedure of dissolving the polyester resin (a1) in the ketone-based solvent and the subsequent procedure of adding the neutralizing agent may be usually carried out at a temperature not higher than a boiling point of the ketone-based solvent. Examples of water used in the above method include deionized water.

As the ketone-based solvent, there may be used those described above. From the viewpoints of a dissolvability of the polyester resin (a1) and easiness of removal of the solvent, among these ketone-based solvents, methyl ethyl ketone is preferred.

Examples of the neutralizing agent include aqueous alkali solutions such as aqueous ammonia and an aqueous sodium hydroxide solution; and amines such as allyl amine, isopropyl amine, diisopropyl amine, ethyl amine, diethyl amine, triethyl amine, 2-ethylhexyl amine, tri-n-octyl amine, t-butyl amine, sec-butyl amine, propyl amine, methylaminopropyl amine, dimethylaminopropyl amine, n-propanol amine, butanol amine, 5-amino-4-octanol, monoethanol amine, N,N-dimethylethanol amine, isopropanol amine, neopentanol amine, diglycol amine, ethylene diamine and piperazine. The neutralizing agent may be used in an amount enough to neutralize at least an acid value of the polyester resin (a1).

<Step (2)>

In the step (2), the above addition-polymerizable monomer (a2) is added to the aqueous dispersion obtained in the step (1) to polymerize the resin (a1) with the monomer (a2), thereby obtaining an aqueous dispersion of the resin (A) for thermal transfer image-receiving sheets (hereinafter occasionally referred to merely as an "aqueous dispersion (A)").

First, the addition-polymerizable monomer (a2) is added to the aqueous dispersion of the polyester resin (a1). The amount of the addition-polymerizable monomer (a2) added is controlled such that the weight ratio of the polyester resin (a1) to the addition-polymerizable monomer (a2) [polyester resin (a1)/addition-polymerizable monomer (a2)] is preferably from 55/45 to 95/5, more preferably from 65/35 to 95/5, further preferably from 75/25 to 95/5 and furthermore preferably from 85/15 to 95/5.

In addition, in view of a good stirring efficiency, water and the like may be further added to the aqueous dispersion.

Next, the addition-polymerizable monomer (a2) is polymerized in the presence of the polyester resin (a1).

Upon the polymerization, a radical polymerization initiator, a crosslinking agent and the like may be added as an optional component, if required. The radical polymerization initiator used above is preferably a water-soluble radical polymerization initiator, and more preferably a persulfuric acid salt.

The mixed solution containing the polyester resin (a1) and the addition-polymerizable monomer (a2) is heated to promote the polymerization reaction therebetween. The polymerization temperature may vary depending upon kind of polymerization initiator used. For example, when using sodium persulfate as the polymerization initiator, from the viewpoint of carrying out the polymerization reaction in an efficient manner, the polymerization temperature is preferably from 60 to 100° C. and more preferably from 70 to 90° C.

The glass transition temperature of the graft polymer in the thus obtained aqueous dispersion (A) is preferably from 40 to 80° C., more preferably from 50 to 80° C. and further preferably from 60 to 80° C. from the viewpoints of storage stability of the aqueous dispersion as well as storage stability and dyeability of the resulting thermal transfer image-receiving sheet. The softening point of the graft polymer is preferably from 80 to 250° C. and more preferably from 120 to 220° C.

The concentration of solid components in the aqueous dispersion (A) is preferably from 20 to 40% by weight, more preferably from 25 to 40% by weight and further preferably from 30 to 40% by weight from the viewpoints of a good dispersibility of the resin particles in the dispersion and a high productivity of the aqueous dispersion. The pH value of the aqueous dispersion (A) as measured at 25° C. is preferably from 5 to 10, more preferably from 6 to 9 and further preferably from 7 to 9 from the viewpoint of storage stability of the aqueous dispersion (A).

The resin particles contained in the aqueous dispersion (A) preferably have a volume-median particle size ($D_{50}$) of from 20 to 1000 nm, more preferably from 50 to 800 nm and further preferably from 80 to 500 nm from the viewpoint of a film-forming property upon production of the thermal transfer image-receiving sheet. The "volume-median particle size ($D_{50}$)" as used herein means a particle size at which a cumulative volume frequency calculated on the basis of a volume fraction of particles from a smaller particle size side thereof is 50%, and may be measured by the method described below in Examples.

[Resin Composition for Thermal Transfer Image-Receiving Sheets]

The dye receiving layer of the thermal transfer image-receiving sheet according to the present invention may also contain a compound (B) containing a 2,2-bis(4-hydroxyphenyl)propane moiety and having a melting point of less than 30° C. More specifically, the dye receiving layer of the thermal transfer image-receiving sheet according to the present invention may contain a resin composition including the resin (A) for thermal transfer image-receiving sheets and the compound (B) containing a 2,2-bis(4-hydroxyphenyl)propane moiety and having a melting point of less than 30° C. (hereinafter occasionally referred to merely as a "resin composition for thermal transfer image-receiving sheets"). The compound (B) has a portion having the same structure as that of the resin (A) for thermal transfer image-receiving sheets and therefore exhibits a high affinity with the resin (A) and enhances a mobility of molecules in the resin. As a result, it is considered that dyes are penetrated into an inside of the dye receiving layer, so that the thermal transfer image-receiving sheet can be considerably enhanced in dyeability and light fastness.

(Compound (B))

The compound (B) contains a 2,2-bis(4-hydroxyphenyl)propane moiety and has a melting point of less than 30° C. The compound (B) preferably contains a moiety composed of an alkyleneoxide adduct of 2,2-bis(4-hydroxyphenyl)propane from the viewpoint of enhancing an affinity with the resin (A) as well as dyeability and light fastness of the thermal transfer image-receiving sheet.

The suitable structure of the moiety composed of an alkyleneoxide adduct of 2,2-bis(4-hydroxyphenyl)propane in the compound (B) is represented by the above formula (I). In the formula (I), $R^1O$ and $R^2O$ are respectively an oxyalkylene group, preferably each independently an oxyalkylene group having 1 to 4 carbon atoms, and more preferably an oxyethylene group or an oxypropylene group. The suffixes x and y each correspond to a molar number of addition of alkyleneoxides and are respectively a positive number. In addition, from the viewpoint of a good reactivity with the carboxylic acid component, a sum of x and y is preferably from 2 to 7, more preferably from 2 to 5 and further preferably from 2 to 3 on the average.

The compound (B) is preferably in the form of a diester obtained from the 2,2-bis(4-hydroxyphenyl)propane moiety or the moiety composed of an alkyleneoxide adduct of 2,2-bis(4-hydroxyphenyl)propane, and a carboxylic acid.

Examples of the carboxylic acid include aliphatic monocarboxylic acids and aromatic monocarboxylic acids. Among these carboxylic acids, preferred are aliphatic monocarboxylic acids. Specific examples of the aliphatic monocarboxylic acids include butanoic acid, hexanoic acid, octanoic acid, decanoic acid, dodecanoic acid, octadecanoic acid, octadecenoic acid and docosanoic acid. Among these carboxylic acids, dodecanoic acid is preferred from the viewpoints of a plasticizing effect and dyeability.

The compound (B) is preferably a diester obtained from an alkyleneoxide adduct of 2,2-bis(4-hydroxyphenyl)propane and an aliphatic monocarboxylic acid, and more preferably a diester obtained from an ethylene adduct of 2,2-bis(4-hydroxyphenyl)propane and lauric acid.

The compound (B) has a melting point of less than 30° C. from the viewpoints of plasticizing the resin and enhancing dyeability and light fastness of the thermal transfer image-receiving sheet. The melting point may be measured using a differential scanning calorimeter (tradename "DSC 210" available from Seiko Electronics Industrial Co., Ltd.) under the following measuring conditions. That is, the melting point is determined as a temperature at which an endothermic peak is observed when a sample is heated to 150° C. and then cooled from 150° C. to −100° C. at a temperature drop rate of 10° C./min, and thereafter heated again at temperature rise rate of 10° C./min. In addition, the compound (B) preferably has a viscosity of from 1 to 500 mPa·s as measured at 30° C. The viscosity of the compound (B) may be measured using a B-type viscometer.

In the resin composition for thermal transfer image-receiving sheets used in the present invention, the weight ratio of the resin (A) to the compound (B) [resin (A)/compound (B)] is preferably from 100/5 to 100/40, more preferably from 100/5 to 100/30 and further preferably from 100/5 to 100/20 from the viewpoint of dyeability and light fastness, in particular, furthermore preferably from 100/5 to 100/10 from the viewpoint of dyeability and from 100/10 to 100/20 from the viewpoint of light fastness.

[Method for Producing Resin Composition for Thermal Transfer Image-Receiving Sheets]

The resin (A) and the compound (B) may be compounded into the resin composition for thermal transfer image-receiving sheets used in the present invention, by any suitable methods. The resin composition for thermal transfer image-receiving sheets is preferably produced by the method including the steps of polycondensing an alcohol component containing an alkyleneoxide adduct of 2,2-bis(4-hydroxyphenyl)propane in an amount of 60 mol % or more with a carboxylic acid component to prepare the polyester resin (a1) containing a non-aromatic carbon-to-carbon unsaturated bond and having an acid value of from 5 to 40 mgKOH/g; mixing the polyester resin (a1) with the compound (B) and an aqueous medium to obtain an aqueous dispersion containing the resin (a1) and the compound (B) enclosed in the resin (a1); and addition-polymerizing the addition-polymerizable monomer (a2) with the resin (a1) to obtain an aqueous dispersion containing the resin (A) and the compound (B) enclosed in the resin (A).

In particular, the resin composition for thermal transfer image-receiving sheets is more preferably produced by the method including the following steps (c1) to (c3).

Step (c1): mixing the polyester resin (a1) with the compound (B) to obtain a resin mixture;

Step (c2): mixing the resin mixture obtained in the step (c1) with an aqueous medium to obtain an aqueous dispersion of the resin mixture; and Step (c3): adding the addition-polymerizable monomer (a2) to the aqueous dispersion obtained in the step (c2) to polymerize the resin (a1) with the addition-polymerizable monomer (a2), thereby obtaining an aqueous dispersion of a resin composition for thermal transfer image-receiving sheets in which the compound (B) is enclosed in the resin (A).

<Step (c1)>

In the step (c1), the polyester resin (a1) is mixed with the compound (B) to obtain the resin mixture.

As the method of mixing the polyester resin (a1) with the compound (B), there is preferably used the method of dissolving the polyester resin (a1) in a ketone-based solvent and then mixing the compound (B) in the resulting solution.

More specifically, for example, using a reactor equipped with a stirrer, a reflux condenser, a thermometer, a dropping funnel and a nitrogen gas inlet tube, the polyester resin (a1), the compound (B) and the ketone-based solvent are mixed with each other therein to obtain the resin mixture in the form of a solution.

The ketone-based solvent used may be the same as those described in the above step (1), and the suitable range of an amount of the ketone-based solvent used may also be the same as that used in the step (1).

<Step (c2)>

In the step (c2), the resin mixture obtained in the step (c1) is mixed with an aqueous medium to obtain an aqueous dispersion of the resin mixture.

The aqueous medium used for dispersing the resin mixture may be the same as described in the above step (1).

In addition, the method of dispersing the resin mixture in the aqueous medium may also be the same as described in the above step (1).

<Step (c3)>

In the step (c3), the addition-polymerizable monomer (a2) is added to the aqueous dispersion obtained in the step (c2) to polymerize the resin (a1) with the addition-polymerizable monomer (a2), thereby obtaining an aqueous dispersion of a resin composition for thermal transfer image-receiving sheets in which the compound (B) is enclosed in the resin (A). The specific method used for carrying out the step (c3) may be the same as described in the above step (2).

The suitable ranges of the glass transition temperature and softening point of a graft polymer contained in the thus obtained aqueous dispersion, the concentration of solid components in the aqueous dispersion, the pH value of the aqueous dispersion as measured at 25° C., and the volume-median particle size ($D_{50}$) of resin particles contained in the aqueous dispersion, are the same as those described above concerning the aqueous dispersion (A) of the resin (A) for thermal transfer image-receiving sheets.

[Thermal Transfer Image-Receiving Sheet]

The thermal transfer image-receiving sheet of the present invention includes a substrate and a dye receiving layer formed on the substrate which contains the resin (A) for thermal transfer image-receiving sheets or the resin composition for thermal transfer image-receiving sheets.

(Substrate)

Examples of the substrate include synthetic papers (such as polyolefin-based papers and polystyrene-based papers), wood-free papers, art papers, coated papers, cast coated papers, wall papers, backing papers, synthetic resin- or emulsion-impregnated papers, synthetic rubber latex-impregnated papers, synthetic resin-internally added papers, paper boards, cellulose fiber papers, and films or sheets made of various resins such as polyolefins, polyvinyl chloride, polyethylene terephthalate, polystyrene, polymethacrylate and polycarbonates. Further, as the substrate, there may also be used white opaque films produced by shaping a mixture of these resins with a white pigment or a filler into a film, or foamed sheets, as well as laminates composed of combination of these substrates.

The thickness of these substrates is generally, for example, from about 10 to about 300 μm. The substrates are preferably subjected to surface treatments such as primer treatment and corona discharge treatment from the viewpoint of enhancing an adhesion thereof to the dye receiving layer.

(Dye Receiving Layer)

The dye receiving layer in the thermal transfer image-receiving sheet of the present invention contains the resin for thermal transfer image-receiving sheets or the resin composition for thermal transfer image-receiving sheets according to the present invention.

The dye receiving layer may be formed by the method using a coating solution prepared by dissolving the resins in an organic solvent or by the method using a coating solution containing a resin dispersion prepared by dispersing each resin in an organic solvent or water. From the viewpoints of an environmental safety and the like, the latter method is preferred. More preferably, the dye receiving layer is produced by the method including the following steps (3) and (4).

Step (3): preparing a dye receiving layer coating solution containing an aqueous dispersion of the resin for thermal transfer image-receiving sheets obtained in the above step (2) or an aqueous dispersion of the resin composition for thermal transfer image-receiving sheets obtained in the above step (c3); and Step (4): forming the dye receiving layer by using the dye receiving layer coating solution obtained in the step (3).

<Step (3)>

In the step (3), the dye receiving layer coating solution containing an aqueous dispersion of the resin for thermal transfer image-receiving sheets obtained in the above step (2) or an aqueous dispersion of the resin composition for thermal transfer image-receiving sheets obtained in the above step (c3) is prepared.

The dye receiving layer coating solution preferably contains a releasing agent from the viewpoint of further enhancing a releasing property of the resulting thermal transfer image-receiving sheet upon the thermal transfer. As the releasing agent, there may be appropriately used, for example, dispersible or water-soluble modified silicone oils and the like. The dye receiving layer coating solution may contain the releasing agent in an amount of from 0.1 to 20 parts by weight and preferably from 0.5 to 10 parts by weight on the basis of 100 parts by weight of the resin for thermal transfer image-receiving sheets obtained in the above step (2) or the resin composition for thermal transfer image-receiving sheets obtained in the step (c3). Examples of commercially available product of the releasing agent suitably used in the present invention include "KF-615A" (tradename) available from Shin-Etsu Chemical Co., Ltd.

In order to uniformly disperse or dissolve the releasing agent in the coating solution, there is preferably used a stirrer such as a ball mill, and the temperature used for dispersing or dissolving the releasing agent is preferably from 20 to 40° C.

Also, the dye receiving layer coating solution preferably contains a coalescent. Examples of the coalescent include butyl carbitol acetate, diethyl carbitol and gelatin. Among these coalescents, gelatin is preferred from the viewpoint of strength and releasability of the dye receiving layer.

From the viewpoint of uniformly dissolving the coalescent in the coating solution, the coalescent is preferably previously dissolved in water. More specifically, it is preferred that the aqueous dispersion of the resin composition for thermal transfer image-receiving sheets be mixed with an aqueous solution of the coalescent while stirring to obtain the coating solution. As the stirrer, there may be suitably used a ball mill and the like. In order to uniformly mix the coalescent in a dissolved state in the coating solution, the stirring temperature is preferably from 30 to 60° C. and more preferably from 40 to 50° C.

The dye receiving layer coating solution may further contain a pigment or a filler such as titanium oxide, zinc oxide, kaolin clay and calcium carbonate from the viewpoints of improving a whiteness of the dye receiving layer and enhancing a clarity of transferred images. From the viewpoint of a good whiteness of the thermal transfer image-receiving sheet of the present invention, the dye receiving layer coating solution may contain the pigment or the filler in an amount of from 0.1 to 20 parts by weight on the basis of 100 parts by weight of the resin for thermal transfer image-receiving sheets obtained in the above step (2) or the resin composition for thermal transfer image-receiving sheets obtained in the step (c3). Meanwhile, the dye receiving layer coating solution may also contain the other additives, such as a catalyst and a curing agent, if required.

In addition, the dye receiving layer coating solution may also contain resins other than the resin for thermal transfer image-receiving sheets used in the present invention unless the addition of the other resins adversely affects the aimed effects of the present invention. Specific examples of the other resins include vinyl chloride polymers, vinyl chloride-vinyl acetate copolymers, vinyl chloride-acryl copolymers and polyurethanes. Among these resins, from the viewpoints of dyeability and light fastness of the resulting thermal transfer image-receiving sheet and a dispersibility of the resin dispersion, preferred are vinyl chloride-acryl copolymers.

These other resins may be dissolved in an organic solvent together with the resin for thermal transfer image-receiving sheets used in the present invention in the course of the production of the resins to thereby incorporate the resins into the dye receiving layer coating solution. Further, after preparing a resin dispersion containing these other resins, the obtained resin dispersion may be added to and mixed in the aqueous dispersion of the resin composition for thermal transfer image-receiving sheets to thereby incorporate the resins into the dye receiving layer coating solution.

<Step (4)>

In the step (4), the dye receiving layer is formed by using the dye receiving layer coating solution obtained in the step (3).

The dye receiving layer in the thermal transfer image-receiving sheet of the present invention may be formed by applying the coating solution onto at least one surface of the substrate and then drying the obtained coating layer. The application of the coating solution is preferably carried out, for example, by a gravure printing method, a screen printing method, a reverse roll coating method using a gravure printing plate and the like. In the case where an intermediate layer is formed between the substrate and the dye receiving layer as described below, an intermediate layer coating solution and the dye receiving layer coating solution may be successively applied in an overlapped manner onto at least one surface of the substrate and then dried to form the intermediate layer and the dye receiving layer on the substrate.

The thickness of the dye receiving layer formed is usually from 1 to 50 μm, and preferably from 3 to 15 μm from the viewpoints of a good image quality and a high productivity. The solid content in the dye receiving layer after dried is preferably from 3 to 15 g per 1 m² of the dye receiving layer.

(Intermediate Layer)

The thermal transfer image-receiving sheet of the present invention preferably includes an intermediate layer formed between the substrate and the dye receiving layer. The intermediate layer more preferably contains a water-soluble polymer and hollow particles.

<Water-Soluble Polymer>

The water-soluble polymer is used as a binder for fixing the hollow particles. Examples of the water-soluble polymer include gelatin, polyvinyl alcohol and polyvinyl pyrrolidone. Among these water-soluble polymers, gelatin is preferred from the viewpoint of such a thermal property that an aqueous solution thereof has a gelling temperature near room temperature ranging from 10 to 30° C. The viscosity (at 60° C.) of the gelatin is preferably from 2.5 to 6.0 mPa·s and more preferably from 3.0 to 5.5 mPa·s as measured according to JIS K6503-2001 from the viewpoints of a good releasability of the thermal transfer image-receiving sheet and a good film-forming property of the coating solution.

The content of the water-soluble polymer in the intermediate layer is preferably from 1 to 75% by weight and more preferably from 1 to 50% by weight on the basis of a whole weight of the intermediate layer.

The water-soluble polymer contained in the intermediate layer is preferably crosslinked with a crosslinking agent such as aldehydes, epoxy compounds, vinyl sulfones, triazines and carbodiimides.

<Hollow Particles>

The hollow particles contained in the intermediate layer are not particularly limited as long as they are polymer particles having voids in at least a part thereof. Examples of the hollow particles include 1) non-foamed type hollow particles formed by evaporating water present within an outer particle wall made of a resin after applying and drying the coating solution to thereby render an inside of each particle hollow; 2) hollow particles formed by heating particles obtained by coating a low-boiling point liquid such as butane and pentane with a resin to swell the low-boiling point liquid within the respective particles and thereby render an inside of each particle hollow; 3) hollow polymer particles formed by previously heating and foaming the hollow particles obtained in the above 2); and 4) hollow particles formed by neutralizing at least a part of acid groups contained in a polymer forming the resin particles. In the present invention, among these hollow particles, from the viewpoints of a good dyeability of the thermal transfer image-receiving sheet as well as a good adhesion between the intermediate layer and the dye receiving layer in the thermal transfer image-receiving sheet, the hollow particles obtained by the method 1) or 3) are preferably used.

The material constituting the hollow particles is not particularly limited, and there may be employed various known materials usable in the above method 1) to 3). Examples of the material constituting the hollow particles include acrylic resins such as polyacrylic acid, polyacrylic acid esters, styrene-acryl copolymers and mixtures thereof, as well as polystyrene, polyvinylidene chloride, polyacrylonitrile and vinylidene chloride-acrylonitrile copolymers. In the present invention, from the viewpoints of a good dyeability of the thermal transfer image-receiving sheet as well as a good adhesion between the intermediate layer and the dye receiving layer in the thermal transfer image-receiving sheet, styrene-acryl copolymers, vinylidene chloride-acrylonitrile copolymers and the like are preferably used.

The shape of the hollow particles is not particularly limited, and may be either a spherical shape or any other non-spherical shape. In the present invention, from the viewpoint of a good adhesion between the intermediate layer and the dye receiving layer in the thermal transfer image-receiving sheet, the hollow particles preferably have a substantially spherical shape.

The volume-median particle size ($D_{50}$) of the hollow particles is preferably from 0.1 to 5 μm, more preferably from 0.3 to 3 μm and further preferably from 0.3 to 1 μm from the viewpoint of a good adhesion between the intermediate layer and the dye receiving layer in the thermal transfer image-receiving sheet. The volume-median particle size ($D_{50}$) of the hollow particles may be measured by a field emission-type scanning electron microscope ("S-4800 Model" (tradename) available from Hitachi, Ltd.).

In the present invention, as the hollow particles, there are preferably used those having a solid content of from 10 to 40% by weight and more preferably from 15 to 35% by weight.

The hollow particles used in the present invention preferably have a methyl ethyl ketone (MEK) insoluble content of 70% by weight or less, more preferably from 10 to 70% by weight and further preferably from 30 to 70% by weight from the viewpoints of a good dyeability of the thermal transfer image-receiving sheet as well as a good adhesion between the intermediate layer and the dye receiving layer in the thermal transfer image-receiving sheet. The term "MEK insoluble content" as used herein is defined by a weight ratio of insoluble hollow particle components to whole components of the hollow particles as measured by dissolving 2.0 parts by weight of the hollow particles in 95 parts by weight of MEK at 25° C.

The MEK insoluble content of the hollow particles may be suitably adjusted, for example, by controlling a crosslinking degree of the resin constituting the hollow particles.

In the present invention, the hollow particles are preferably used in the form of a dispersion thereof in an aqueous medium. Examples of commercially available hollow particles preferably used in the present invention include "Nipol MH8101" (tradename) available from Zeon Corporation and "SX8782(D)" (tradename) available from JSR Corporation.

From the viewpoints of a good dyeability with dyes and a good adhesion between the intermediate layer and the dye receiving layer in the thermal transfer image-receiving sheet, the weight ratio of the hollow particles to the water-soluble polymer (hollow particles/water-soluble polymer) contained in the intermediate layer is preferably from 30/70 to 90/10, more preferably from 40/60 to 80/20 and further preferably from 50/50 to 80/20.

Meanwhile, the intermediate layer may contain a pigment or a filler such as titanium oxide, zinc oxide, kaolin clay, calcium carbonate and silica fine particles from the viewpoint of enhancing a whiteness of the intermediate layer and a clarity of transferred images. The content of the pigment or filler in the intermediate layer is preferably from 0.1 to 20 parts by weight and more preferably from 0.1 to 10 parts by weight on the basis of 100 parts by weight of water-soluble polymer from the viewpoint of a good whiteness of the thermal transfer image-receiving sheet.

The intermediate layer may further contain, if required, various additives such as a coalescent such as glycol ethers, a releasing agent, a curing agent and a catalyst.

The intermediate layer may be formed by applying a coating solution prepared by dispersing or dissolving the hollow particles and the water-soluble polymer, if required, together with various optional additives, in an organic solvent or water, onto at least one surface of the substrate for the thermal transfer image-receiving sheet, and then drying the resulting coating layer.

The thickness of the intermediate layer is preferably from 10 to 100 μm and more preferably from 20 to 50 μm from the viewpoints of a good cushioning property and a good heat-insulating property. The solid content of the intermediate layer after drying is preferably from 7 to 70 $g/m^2$ per 1 $m^2$ of the intermediate layer.

More specifically, the intermediate layer may be formed, for example, by applying a coating solution prepared by dispersing or dissolving the water-soluble polymer including gelatin and the hollow particles, if required, together with various optional additives, in water, onto at least one surface of a substrate for the thermal transfer image-receiving sheet, for example, by a gravure printing method, a screen printing method, a reverse roll coating method using a gravure printing plate and the like and drying the obtained coating layer.

[Transfer Sheet]

The transfer sheet (ink ribbon) used upon conducting a thermal transfer procedure using the above thermal transfer image-receiving sheet of the present invention is usually in the form of a laminated sheet obtained by laminating a dye layer containing a sublimation dye, a protective layer to be transferred on a transferred image of the dye received on the image-receiving sheet and the like, on a paper or a polyester film. In the present invention, there may be used any optional transfer sheets.

Examples of the sublimation dye suitably used for the thermal transfer image-receiving sheet of the present invention include yellow dyes such as pyridone-azo-based dyes, dicyano-styryl-based dyes, quinophthalone-based dyes and merocyanine-based dyes; magenta dyes such as benzene-azo-based dyes, pyrazolone-azomethine-based dyes, isothiazole-based dyes and pyrazolo-triazole-based dyes; and cyan dyes such as anthraquinone-based dyes, cyano-methylene-based dyes, indophenol-based dyes and indonaphthol-based dyes.

As the method for applying a heat energy upon the thermal transfer, there may be used any optional methods, for example, the method of applying a heat energy of from about 5 to about 100 mJ/mm$^2$ by controlling a recording time using a recording apparatus such as a thermal printer.

EXAMPLES

In the following Production Examples, Reference Examples, Examples and Comparative Examples, measurements of various properties and evaluations of the obtained thermal transfer image-receiving sheets were carried out by the following methods.

<Measurements of Properties>

[Softening Point of Resin]

Using a flow tester "CFT-500D" (tradename) available from Shimadzu Corporation, 1 g of a sample was extruded through a nozzle having a die pore diameter of 1 mm and a length of 1 mm while heating the sample at a temperature rise rate of 6° C./min and applying a load of 1.96 MPa thereto by a plunger. The softening point was determined as the temperature at which a half amount of the sample was flowed out when plotting a downward movement of the plunger of the flow tester relative to the temperature.

[Glass Transition Temperature of Resin]

Using a differential scanning calorimeter ("Pyris 6 DSC" (tradename) available from PerkinElmer, Co., Ltd.), a sample was heated to 200° C. and then cooled from 200° C. to 0° C. at a temperature drop rate of 10° C./min, and thereafter heated again at a temperature rise rate of 10° C./min. The temperature at which an extension of a baseline below a maximum peak temperature observed in the endothermic curve was intersected with a tangential line having a maximum inclination of the curve in a region of from a rise-up portion of the peak to an apex of the peak was read as the glass transition temperature of the sample.

[Acid Value of Resin]

The acid value of a resin was measured by the same method as prescribed in JIS K0070 except that the mixed solvent of ethanol and an ether was replaced with a mixed solvent containing acetone and toluene at a volume ratio of 1:1.

[Number-Average Molecular Weight of Resin]

The number-average molecular weight was calculated from the molecular weight distribution measured by gel permeation chromatography according to the following method.

(1) Preparation of Sample Solution

The binder resin was dissolved in chloroform to prepare a solution having a concentration of 0.5 g/100 mL. The resultant solution was then filtered through a fluororesin filter ("FP-200" (tradename) available from Sumitomo Electric Industries, Ltd.) having a pore size of 2 μm to remove insoluble components therefrom, thereby preparing a sample solution.

(2) Measurement of Molecular Weight

Tetrahydrofuran as a dissolvent was allowed to flow at a rate of 1 mL/min, and the column was stabilized in a thermostat at 40° C. One-hundred microliters of the sample solution were injected into the column to measure a molecular weight distribution thereof. The number-average molecular weight of the sample was calculated on the basis of a calibration curve previously prepared. The calibration curve of the molecular weight was prepared by using several kinds of monodisperse polystyrenes (those monodisperse polystyrenes having weight-average molecular weights of $2.63 \times 10^3$, $2.06 \times 10^4$ and $1.02 \times 10^5$ available from Tosoh Corporation; and those monodisperse polystyrenes having weight-average molecular weights of $2.10 \times 10^3$, $7.00 \times 10^3$ and $5.04 \times 10^4$ available from GL Science Inc.) as standard samples.

Analyzer: CO-8010 (tradename; available from Tosoh Corporation)

Column: GMHXL+G3000HXL (tradenames; both available from Tosoh Corporation)

[Volume-Median Particle Size ($D_{50}$) of Resin Particles in Aqueous Dispersion]

Using a laser diffraction particle size analyzer ("LA-920" (tradename) available from HORIBA, Ltd.), a cell for the measurement was filled with the aqueous dispersion and distilled water, and a volume median particle size ($D_{50}$) of the resin particles was measured at a concentration at which an absorbance thereof was within an adequate range.

[Solid Content of Aqueous Dispersion]

Using an infrared moisture meter ("FD-230" (tradename) available from Kett Electric Laboratory), 5 g of the aqueous dispersion was dried at 150° C. under a measuring mode 96 (monitoring time: 2.5 min; variation width: 0.05%), and the water content (wt %) of the aqueous dispersion on a wet base was measured. The solid content of each dispersion was calculated according to the following formula.

$$\text{Solid Content (wt \%)} = 100 - M$$

wherein M is a water content (wt %) on a wet base of the aqueous dispersion represented by the following formula:

$$M = [(W - W_0)/W] \times 100$$

wherein W is a weight of the sample before measurement (initial weight of the sample); and $W_0$ is a weight of the sample after measurement (absolute dry weight of the sample).

[pH of Aqueous Dispersion]

Using a pH meter ("HM-20P" (tradename) available from DKK-Toa Corporation), a pH value of the aqueous dispersion was measured at 25° C.

[Methyl Ethyl Ketone-Insoluble Content]

The aqueous dispersion of the resin for thermal transfer image-receiving sheets was freeze-dried at −10° C. for 9 hours using a freeze dryer ("FDU-2100" (tradename) available from Tokyo Rikakikai Co., Ltd.), and 0.5 g (W2) of the obtained freeze-dried resin was weighed and charged into a capped centrifuge tube (weight of centrifuge tube: W1), followed by adding 16 g of methyl ethyl ketone thereto. The resulting mixture was stirred over 3 hours or longer using a mixing rotor, and then subjected to centrifugal separation at 25,000 rpm for 30 minutes using a centrifugal separator (table top high-speed centrifuge "3K30C" (tradename) with a rotor "S12158" (tradename) both available from SIGMA Laborzentrifugen GmbH, Germany), followed by subjecting the resulting liquid to decantation to separate it into a methyl ethyl ketone-insoluble component and a methyl ethyl ketone-soluble component. Then, 12 g of methyl ethyl ketone were further added to the thus separated methyl ethyl ketone-insoluble component, and the resulting mixture was repeatedly subjected to the same centrifugal separation and decantation procedures as described above to separate it into a methyl ethyl ketone-insoluble component and a methyl ethyl ketone-soluble component. The finally obtained methyl ethyl ketone-insoluble component was dried under reduced pressure together with the centrifuge tube at 80° C. for 12 hours or longer, and the weight (W3) of the resulting dried product was measured to calculate a methyl ethyl ketone-insoluble content in the resin according to the following formula:

Methyl Ethyl Ketone-Insoluble Content (%)={(W3−W1)/W2}×100

[Methyl Ethyl Ketone Swelling Rate]

The aqueous dispersion of the resin for thermal transfer image-receiving sheets was freeze-dried at −10° C. for 9 hours using a freeze dryer ("FDU-2100" (tradename) available from Tokyo Rikakikai Co., Ltd.). Then, about 1 g of the obtained freeze-dried resin was charged into a tableting press metal mold having an inner diameter of 25 mm such that the surface of the resin particles filled was uniform, and the metal mold was set to a press machine to apply a pressure of 10 tons to the resin filled therein for 1 minute, thereby obtaining resin pellets each having a diameter of 25 mm and a thickness of about 1.7 mm. The thus obtained resin pellets were accurately weighed to determine a weight (X1) thereof, and immersed in 20 mL of methyl ethyl ketone and allowed to stand therein for 3 hours. Next, the resulting liquid mixture was filtered through a 200-mesh screen, and after 10 minutes, the weight (X2) of the obtained methyl ethyl ketone-swelled resin was measured to calculate a methyl ethyl ketone swelling rate (wt %) of the resin according to the following formula:

Methyl Ethyl Ketone Swelling Rate (wt %)={(X2−X1)/X1}×100

<Evaluation of Thermal Transfer Image-Receiving Sheet>
(Dyeability)

The black (K) gradation pattern was printed on the thermal transfer image-receiving sheet as produced, using a commercially available sublimation-type printer ("MEGAPIXEL III" (tradename) available from Altech Co., Ltd.), and a color density of a printed image thermally transferred in a high-density printing (18th Gradation (L=0: maximum density)) was measured using a Gretag densitometer (available from GretagMacbeth Corporation) to evaluate dyeability of the sheet. The higher density indicates a more excellent dyeability of the sheet.

(Releasability)

The black solid image having a size of 5 cm×5 cm was printed on the thermal transfer image-receiving sheet as produced, under the conditions of 25° C. and 50% RH (relative humidity). The releasability (heat fusibility) between the ink ribbon and the thermal transfer image-receiving sheet upon continuous black solid image printing was evaluated from a sound generated when the ink ribbon was peeled from the thermal transfer image-receiving sheet, according to the following ratings.

AA: Releasable without any strange sound.
A: Releasable with occurrence of slight strange sound.
B: Still releasable despite occurrence of clear strange sound.
C: Heat fusion occurred, and hardly releasable with lack of printed images.
D: Heat fusion occurred, and unreleasable.

(Releasability Under High-Temperature and High-Humidity Conditions)

The thermal transfer image-receiving sheet as produced was preserved under high-temperature and high-humidity conditions, i.e., at 36° C. and 80% RH (relative humidity) for 24 hours. The black solid image having a size of 5 cm×5 cm was printed on the thus preserved thermal transfer image-receiving sheet under the same conditions as used in the above evaluation for dyeability using the above sublimation-type printer ("MEGAPIXEL III"). The releasability under high-temperature and high-humidity conditions between the ink ribbon and the dye-receiving sheet upon subjected to continuous black solid image printing was evaluated from a sound generated when the ink ribbon was peeled from the thermal transfer image-receiving sheet, according to the following ratings.

AA: Releasable without any strange sound.
A: Releasable with occurrence of slight strange sound.
B: Still releasable despite occurrence of clear strange sound.
C: Heat fusion occurred, and hardly releasable with lack of printed images.
D: Heat fusion occurred, and unreleasable.

(Light Fastness)

The light fastness test was carried out using a xenon weather meter under the following conditions. In the light fastness test, the light fastness was evaluated by an amount of change in hue ($\Delta E$).

Illumination tester: "SX75" (tradename) available from Suga Test Instruments Co., Ltd.
Light source: Xenon lamp
Filter: Inside: Quartz filter; Outside: #320
Panel temperature: 50° C.
Humidity inside of vessel: 35 to 50% RH
Illumination intensity: 50 W/m$^2$ as the value measured at a wavelength of 300 to 400 nm
Cumulative illumination intensity: 10,000 kJ/m$^2$ as the cumulative value integrated over a wavelength range of 300 to 400 nm
Amount of change in hue $\Delta E$: An optical reflection density of each of black (K), yellow (Y), magenta (M), cyan (C), green (G), red (R) and blue (B) images on the printed gradation pattern was measured using an optical densitometer (available from GretagMacbeth Corp.). At the step where the optical reflection density before irradiated with light was near 1.0, the L*, a* and b* values before and after irradiated with light were measured using a color/color-difference meter (GretagMacbeth Corp.), and an amount of change in hue $\Delta E$ was calculated from the measured values according to the following formula to evaluate light fastness of the printed images of black (K)+chromatic colors. The smaller the amount of change in hue $\Delta E$, the more higher the light fastness becomes.

Meanwhile, the "light fastness of printed images of black (K)+chromatic colors" as used herein means a sum of amounts of change in hue of the black (K), yellow (Y), magenta (M), cyan (C), green (G), red (R) and blue (B) colors.

Amount of change in hue $\Delta E = [(a^*_1 - a^*_2)^2 + (b^*_1 - b^*_2)^2]^{1/2}$ wherein $L^*_1$, $a^*_1$ and $b^*_1$ respectively represent L*, a* and b* values before irradiated with light; and $L^*_2$, $a^*_2$ and $b^*_2$ respectively represent L*, a* and b* values after irradiated with light.

Production Examples 101 to 104, 106 and 108

Production of Polyester Resins (a1)-1a to (a1)-1d, (a1)-1f and (a1)-1h

The monomers of a polyester resin (a1) except for fumaric acid as shown in Table 1, and tin (II) dioctylate were charged into a 5-L four-necked flask equipped with a thermometer, a stainless steel stirring bar, a falling type condenser and a nitrogen inlet tube. The contents of the flask were reacted in a mantle heater in a nitrogen atmosphere at 235° C. for 5 hours, and further reacted under reduced pressure (8.3 kPa) for 1 hour. Next, fumaric acid and 4-t-butyl catechol were added to the flask at 210° C., and the resulting mixture was reacted for 5 hours, and then further reacted under reduced pressure (20 kPa) until a softening point of the reaction product reached the temperature shown in Table 1 as measured according to ASTM D36-86, thereby obtaining polyester resins (a1)-1a to (a1)-1d, (a1)-1f and (a1)-1h.

Production Example 105

Production of Polyester Resin (a1)-1e

The monomers of a polyester resin (a1) except for fumaric acid as shown in Table 1, and tin (II) dioctylate were charged into a 5-L four-necked flask equipped with a thermometer, a stainless steel stirring bar, a falling type condenser and a nitrogen inlet tube. The contents of the flask were reacted in a mantle heater in a nitrogen atmosphere at 210° C. for 5 hours, and further reacted under reduced pressure (8.3 kPa) for 1 hour. Next, fumaric acid and 4-t-butyl catechol were added to the flask, and the resulting mixture was reacted for 5 hours, and then further reacted under reduced pressure (20 kPa) until a softening point of the reaction product reached the temperature shown in Table 1 as measured according to ASTM D36-86, thereby obtaining a polyester resin (a1)-1e.

Production Example 107

Production of Polyester Resin (a1)-1g

The monomers of a polyester resin (a1) as shown in Table 1, and tin (II) dioctylate were charged into a 5-L four-necked flask equipped with a thermometer, a stainless steel stirring bar, a falling type condenser and a nitrogen inlet tube. The contents of the flask were reacted in a mantle heater in a nitrogen atmosphere at 210° C. for 10 hours, and then further reacted under reduced pressure (20 kPa) until a softening point of the reaction product reached the temperature shown in Table 1 as measured according to ASTM D36-86, thereby obtaining a polyester resin (a1)-1g.

The properties of the thus obtained polyester resins (a1)-1a to (a1)-1h were measured by the above methods. The results are shown in Table 1.

TABLE 1

| | | | \multicolumn{8}{c}{Production Examples} | | | | | | | |
| --- | --- | --- | --- | --- | --- | --- | --- | --- | --- | --- |
| | | | 101 | 102 | 103 | 104 | 105 | 106 | 107 | 108 |
| Polyester resin (a1) | | | 1a | 1b | 1c | 1d | 1e | 1f | 1g | 1h |
| Monomers | Alcohol component (g) | BPA-PO(*1) | 3,424 (100) | 3,441 (100) | 3,391 (100) | 3,458 (100) | 3,390 (100) | 2,653 (60) | 3,318 (100) | 2,070 (40) |
| | | Ethylene glycol | — | — | — | — | — | 314 (40) | — | 550 (60) |
| | Carboxylic acid component (g) | Isophthalic acid | 1,348 (83) | 1,387 (80) | 1,496 (93) | 1,197 (73) | — | 1,740 (83) | — | 2,037 (83) |
| | | 1,4-Cyclohexane-dicarboxylic acid | — | — | — | — | 1,384 (83) | — | 1,681 (103) | — |
| | | Fumaric acid | 227 (20) | 171 (20) | 113 (10) | 344 (30) | 225 (20) | 293 (20) | — | 343 (20) |
| Radical polymerization inhibitor | 4-t-Butyl catechol (g) | | 2.5 | 2.5 | 2.5 | 2.5 | 2.5 | 2.5 | — | 2.5 |
| Catalyst | Tin (II) dioctylate (g) | | 25 | 25 | 25 | 25 | 25 | 25 | 25 | 25 |
| Properties | Softening point (° C.) | | 111 | 114 | 115 | 107 | 96 | 105 | 100 | 107 |
| | Glass transition temperature (° C.) | | 66 | 69 | 69 | 65 | 57 | 61 | 57 | 59 |
| | Acid value (mgKOH/g) | | 23 | 15 | 19 | 23 | 24 | 31 | 24 | 27 |
| | Number-average molecular weight | | 3,600 | 3,700 | 4,000 | 3,800 | 3,600 | 3,000 | 4,000 | 2,700 |

Note
The numerals in parentheses each represent a molar ratio based on 100 mol as a total amount of alcohol component.
(*1)Polyoxypropylene (2.2)-2,2-bis(4-hydroxyphenyl)propane (molar number of addition of polyoxypropylene: 2.2 mol)

Production Examples 109 to 119

Production of Aqueous Dispersions 1-(i) to 1-(xi) of Polyester Resin (a1)

Step (1)

A 10-L four-necked flask equipped with a nitrogen inlet tube, a reflux condenser, a stirrer and a thermocouple was charged with the respective polyester resins (a1)-1a to (a1)-1h with the formulations as shown in Table 2, and the contents of the flask were dissolved in methyl ethyl ketone at 25° C. (in which upon production of the dispersions (vi), (ix) and (xi), lauryl acrylate used in the subsequent step was dissolved together with the polyester at the same time). Next, a 25% ammonia aqueous solution was added to the resulting solution, and then deionized water was added thereto while stirring. The resulting mixture was placed under reduced pressure at 60° C. to remove methyl ethyl ketone therefrom, cooled to room temperature and then filtered through a 200-mesh screen, thereby obtaining aqueous dispersions 1-(i) to 1-(xi) of the polyester resin (a1).

The properties of the thus obtained aqueous dispersions 1-(i) to 1-(xi) were measured by the above methods. The results are shown in Table 2.

TABLE 2

| | Production Examples | | | | | |
|---|---|---|---|---|---|---|
| | 109 | 110 | 111 | 112 | 113 | 114 |
| Aqueous dispersion of polyester resin (a1) | 1-(i) | 1-(ii) | 1-(iii) | 1-(iv) | 1-(v) | 1-(vi) |
| Polyester resin (a1)　　Kind | 1a | 1b | 1c | 1d | 1e | 1a |
| 　　Amount (g) | 2,500 | 2,500 | 2,500 | 2,500 | 2,500 | 2,250 |
| Addition-polymerizable　Lauryl acrylate (g) monomer (a2) | — | — | — | — | — | 125 |
| Methyl ethyl ketone (g) | 2,500 | 2,500 | 2,500 | 2,500 | 2,500 | 2,500 |
| 25% Ammonia aqueous solution (g) | 45 | 27 | 41 | 48 | 72 | 40 |
| Deionized water (g) | 5,830 | 5,830 | 5,830 | 5,830 | 5,830 | 5,830 |
| Properties　Volume-median particle size (nm) | 130 | 290 | 130 | 90 | 160 | 130 |
| 　　Solid content (wt %) | 35 | 46 | 41 | 39 | 38 | 41 |
| 　　pH | 7.0 | 6.4 | 6.9 | 6.9 | 7.7 | 6.4 |

| | Production Examples | | | | |
|---|---|---|---|---|---|
| | 115 | 116 | 117 | 118 | 119 |
| Aqueous dispersion of polyester resin (a1) | 1-(vii) | 1-(viii) | 1-(ix) | 1-(x) | 1-(xi) |
| Polyester resin (a1)　　Kind | 1f | 1g | 1a | 1h | 1a |
| 　　Amount (g) | 2,500 | 2,500 | 2,250 | 2,500 | 2,250 |
| Addition-polymerizable　Lauryl acrylate (g) monomer (a2) | — | — | 62.5 | — | 37.5 |
| Methyl ethyl ketone (g) | 2,500 | 2,500 | 2,500 | 2,500 | 2,500 |
| 25% Ammonia aqueous solution (g) | 57 | 72 | 40 | 49 | 40 |
| Deionized water (g) | 5,830 | 5,831 | 5,830 | 5,830 | 5,830 |
| Properties　Volume-median particle size (nm) | 500 | 120 | 160 | 240 | 90 |
| 　　Solid content (wt %) | 36 | 41 | 43 | 34 | 39 |
| 　　pH | 6.7 | 7.5 | 6.6 | 6.3 | 7.4 |

Production Examples 120 to 134

Production of Aqueous Dispersions 1-(I) to 1-(XV) of Resin for Thermal Transfer Image-Receiving Sheets Step (2)

A 2-L four-necked flask equipped with a nitrogen inlet tube, a reflux condenser, a dropping funnel, a stirrer and a thermocouple was charged with the respective polyester dispersions, deionized water and styrene as the addition-polymerizable monomer (a2) with the formulations as shown in Table 3 (in which only upon production of the dispersion (XIV), methyl methacrylate was used in place of styrene as shown in Table 3), followed by stirring the contents of the flask for 30 minutes. Then, the contents of the flask were mixed with sodium persulfate under a nitrogen gas flow, and reacted at 80° C. for 6 hours. The resulting reaction mixture was cooled to room temperature and then filtered through a 200-mesh screen, thereby obtaining aqueous dispersions 1-(I) to 1-(XV) of the resin for thermal transfer image-receiving sheets. Meanwhile, the amounts of the respective materials compounded were determined such that the weight ratio between the polyester resin segment (A1) and the addition polymer-based resin segment (A2) in the resin for thermal transfer image-receiving sheets contained in the resulting respective aqueous dispersions was adjusted as shown in Table 3.

The properties of the thus obtained aqueous dispersions 1-(I) to 1-(XV) were measured by the above methods. The results are shown in Table 3.

TABLE 3

| | Production Examples | | | | | | | |
|---|---|---|---|---|---|---|---|---|
| | 120 | 121 | 122 | 123 | 124 | 125 | 126 | 127 |
| Aqueous dispersion of resin for thermal transfer image-receiving sheets | 1-(I) | 1-(II) | 1-(III) | 1-(IV) | 1-(V) | 1-(VI) | 1-(VII) | 1-(VIII) |
| Aqueous dispersion of　Kind | 1-(i) | 1-(ii) | 1-(i) | 1-(i) | 1-(i) | 1-(iii) | 1-(iv) | 1-(v) |
| polyester resin (a1)　Amount (g) | 1,028 | 778 | 914 | 800 | 686 | 878 | 918 | 950 |
| Deionized water (g) | — | 182 | 6 | 80 | 154 | 82 | 42 | 10 |
| Addition-polymerizable　Styrene (g) | 40 | 40 | 80 | 120 | 160 | 40 | 40 | 40 |
| monomer (a2)　Methyl methacrylate (g) | — | — | — | — | — | — | — | — |
| Sodium persulfate (g) | 0.16 | 0.16 | 0.31 | 0.47 | 0.62 | 0.16 | 0.16 | 0.16 |
| Segment (A1)/segment (A2)(*2) (weight ratio) | 90/10 | 90/10 | 80/20 | 70/30 | 60/40 | 90/10 | 90/10 | 90/10 |
| Properties　Solid content (wt %) | 37 | 42 | 40 | 40 | 40 | 43 | 40 | 39 |
| 　　Volume-median particle size (nm) | 140 | 150 | 140 | 140 | 140 | 140 | 90 | 150 |
| 　　pH | 6.9 | 6.2 | 6.8 | 6.8 | 6.7 | 6.7 | 6.6 | 7.3 |

| | Production Examples | | | | | | |
|---|---|---|---|---|---|---|---|
| | 128 | 129 | 130 | 131 | 132 | 133 | 134 |
| Aqueous dispersion of resin for thermal transfer image- receiving sheets | 1-(IX) | 1-(X) | 1-(XI) | 1-(XII) | 1-(XIII) | 1-(XIV) | 1-(XV) |

TABLE 3-continued

| | | 1-(vi) | 1-(vii) | 1-(viii) | 1-(ix) | 1-(x) | 1-(i) | 1-(xi) |
|---|---|---|---|---|---|---|---|---|
| Aqueous dispersion of polyester resin (a1) | Kind | 1-(vi) | 1-(vii) | 1-(viii) | 1-(ix) | 1-(x) | 1-(i) | 1-(xi) |
| | Amount (g) | 576 | 990 | 878 | 1,407 | 854 | 1,028 | 640 |
| Deionized water (g) | | 72 | — | 82 | 67 | 106 | — | 16 |
| Addition-polymerizable monomer (a2) | Styrene (g) | 30 | 40 | 40 | 20 | 40 | — | 27 |
| | Methyl methacrylate (g) | — | — | — | — | — | 40 | — |
| Sodium persulfate (g) | | 0.09 | 0.16 | 0.16 | 0.18 | 0.16 | 0.16 | 0.20 |
| Segment (A1)/segment (A2)(*2) (weight ratio) | | 90/10 | 90/10 | 90/10 | 90/10 | 90/10 | 90/10 | 90/10 |
| Properties | Solid content (wt %) | 40 | 37 | 40 | 41 | 40 | 39 | 39 |
| | Volume-median particle size (nm) | 160 | 490 | 130 | 140 | 120 | 150 | 90 |
| | pH | 6.0 | 6.7 | 7.3 | 6.1 | 6.5 | 7.6 | 7.2 |

Note
(*2)The weight ratio [(A1)/(A2)] represents a weight ratio of polyester resin segment (A1) to addition polymer-based resin segment (A2) in resin for thermal transfer image-receiving sheets.

Examples 101 to 110, Reference Example 101, and Comparative Examples 101 to 105

Production of Thermal Transfer Image-Receiving Sheets

First, the respective components as shown in Table 4 were mixed with each other at 45° C. with the formulations as shown in Table 4 to prepare respective intermediate layer coating solutions. The thus prepared coating solutions were respectively applied onto a synthetic paper "YUPO FGS-250" (tradename; available from Yupo Corporation; thickness: 250 μm; basis weight: 200 g/m²) using a wire bar such that a coating amount thereof after dried was 20.0 g/m², and then dried at 25° C. for 5 minutes, thereby obtaining intermediate layer-coated sheets.

Meanwhile, upon preparation of each intermediate layer, as the hollow particles, there were used those particles composed of the following styrene-acryl copolymer and the following gelatin as a binder.

Styrene-acryl copolymer: "Nipol MH8101" (tradename) available from Zeon Corporation; hollowness rate: 50%; solid content: 26% by weight Gelatin: "G0723K" (tradename) available from Nitta Gelatin Inc.; viscosity: 4.4 mPa·s Next, the respective components as shown in Table 4 were mixed with each other at 25° C. with the formulations as shown in Table 4 to prepare dye receiving layer coating solutions A1 to P1. Meanwhile, the solid content of the aqueous dispersion of the resin for thermal transfer image-receiving sheets used for preparing the respective dye receiving layer coating solutions was adjusted to 30% by weight. In addition, upon preparation of each dye receiving layer coating solution, the following gelatin was used as a coalescent, and the following polyether-modified silicone was used as a releasing agent.

Gelatin: "G0723K" (tradename) available from Nitta Gelatin Inc.; viscosity: 4.4 mPa·s Polyether-modified silicone: "KF-615A" (tradename) available from Shin-Etsu Chemical Co., Ltd.

The thus prepared dye receiving layer coating solutions were respectively applied onto the intermediate layer-coated sheet using a wire bar such that a coating amount thereof after dried was 5.0 g/m², and then dried at 50° C. for 2 minutes, thereby obtaining thermal transfer image-receiving sheets.

The thus obtained thermal transfer image-receiving sheets were evaluated by the above methods. The results are shown in Table 4.

In Table 4, the respective materials used are represented by the following abbreviations.

St: Styrene
LA: Lauryl acrylate
MMA: Methyl methacrylate
BPA-PO: Polyoxypropylene (2.2)-2,2-bis(4-hydroxyphenyl)propane (molar number of addition of polyoxypropylene: 2.2 mol)
IPA: Isophthalic acid
cHxDA: 1,4-Cyclohexanedicarboxylic acid

TABLE 4

| | | Examples | | | | | | | |
|---|---|---|---|---|---|---|---|---|---|
| | | 101 | 102 | 103 | 104 | 105 | 106 | 107 | 108 |
| Intermediate layer coating solution | | | | | | | | | |
| Hollow particles | Styrene-acryl copolymer (g) | 24 | 24 | 24 | 24 | 24 | 24 | 24 | 24 |
| Binder | Gelatin (g) | 1.4 | 1.4 | 1.4 | 1.4 | 1.4 | 1.4 | 1.4 | 1.4 |
| Water | Deionized water (g) | 12.6 | 12.6 | 12.6 | 12.6 | 12.6 | 12.6 | 12.6 | 12.6 |
| Dye receiving layer coating solution | | | | | | | | | |
| Dye receiving layer coating solution | | A1 | B1 | C1 | D1 | E1 | F1 | G1 | H1 |
| Aqueous dispersion of resin for thermal transfer image-receiving sheets | Production Example No. | Pro. Ex. 120 | Pro. Ex. 121 | Pro. Ex. 122 | Pro. Ex. 123 | Pro. Ex. 124 | Pro. Ex. 125 | Pro. Ex. 126 | Pro. Ex. 127 |
| | Aqueous dispersion of resin for thermal transfer image-receiving sheets | 1-(I) | 1-(II) | 1-(III) | 1-(IV) | 1-(V) | 1-(VI) | 1-(VII) | 1-(VIII) |
| | Segment (A2)/fumaric acid(*3) (weight ratio) | 2.4/1 | 2.4/1 | 5.5/1 | 9.4/1 | 14.7/1 | 4.9/1 | 1.6/1 | 2.5/1 |
| | Segment (A1)/segment (A2)(*4) (weight ratio) | 90/10 | 90/10 | 80/20 | 70/30 | 60/40 | 90/10 | 90/10 | 90/10 |
| | Addition-polymerizable monomer (a2) Kind | St | St | St | St | St | St | St | St |
| | Amount (g) | 10 | 10 | 10 | 10 | 10 | 10 | 10 | 10 |
| Coalescent | Gelatin (g) | 0.05 | 0.05 | 0.05 | 0.05 | 0.05 | 0.05 | 0.05 | 0.05 |
| Releasing agent | Polyether-modified silicone (g) | 0.15 | 0.15 | 0.15 | 0.15 | 0.15 | 0.15 | 0.15 | 0.15 |
| Composition of the | Polyester resin (a1) | 1a | 1b | 1a | 1a | 1a | 1c | 1d | 1e |

TABLE 4-continued

| above aqueous dispersion of resin for thermal transfer image-receiving sheets | Aqueous dispersion of polyester resin (a1) | 1-(i) | 1-(ii) | 1-(i) | 1-(i) | 1-(i) | 1-(iii) | 1-(iv) | 1-(v) |
|---|---|---|---|---|---|---|---|---|---|
| | Molar ratio of BPA-PO (in alcohol component) | 100 | 100 | 100 | 100 | 100 | 100 | 100 | 100 |
| | Molar ratio of fumaric acid (in carboxylic acid component) | 20 | 20 | 20 | 20 | 20 | 10 | 30 | 20 |
| | Carboxylic acid other than fumaric acid | IPA | IPA | IPA | IPA | IPA | IPA | IPA | cHxDA |
| | Acid value (mgKOH/g) | 23 | 15 | 23 | 23 | 23 | 19 | 23 | 24 |
| Evaluation | Releasability under high-temperature and high-humidity conditions (black solid image printing) | A | AA | AA | AA | AA | AA | A | B |
| | Releasability (black solid image printing) | AA | AA | AA | AA | AA | AA | AA | A |
| | Dyeability (maximum density) | 1.96 | 2.05 | 1.86 | 1.88 | 1.87 | 2.07 | 1.85 | 1.85 |

|  |  | Examples | | Reference Example | Comparative Examples | | | | |
|---|---|---|---|---|---|---|---|---|---|
|  |  | 109 | 110 | 111 | 101 | 102 | 103 | 104 | 105 |

Intermediate layer coating solution

| Hollow particles | Styrene-acryl copolymer (g) | 24 | 24 | 24 | 24 | 24 | 24 | 24 | 24 |
|---|---|---|---|---|---|---|---|---|---|
| Binder | Gelatin (g) | 1.4 | 1.4 | 1.4 | 1.4 | 1.4 | 1.4 | 1.4 | 1.4 |
| Water | Deionized water (g) | 12.6 | 12.6 | 12.6 | 12.6 | 12.6 | 12.6 | 12.6 | 12.6 |

Dye receiving layer coating solution

| Dye receiving layer coating solution | | J1 | P1 | I1 | K1 | L1 | M1 | N1 | O1 |
|---|---|---|---|---|---|---|---|---|---|
| Aqueous dispersion of resin for thermal transfer image-receiving sheets | Production Example No. | Pro. Ex. 129 | Pro. Ex. 134 | Pro. Ex. 128 | Pro. Ex. 130 | Pro. Ex. 109 | Pro. Ex. 131 | Pro. Ex. 132 | Pro. Ex. 133 |
| | Aqueous dispersion of resin for thermal transfer image-receiving sheets | 1-(X) | 1-(XV) | 1-(IX) | 1-(XI) | 1-(i)(*6) | 1-(XII) | 1-(XIII) | 1-(XIV) |
| | Segment (A2)/fumaric acid(*3) (weight ratio) | 2.4/1 | 2.4/1 | 2.4/1 | — | — | 2.4/1 | 2.4/1 | 2.4/1 |
| | Segment (A1)/segment (A2)(*4) (weight ratio) | 90/10 | 90/10 | 90/10 | 90/10 | 100/0 | 90/10 | 90/10 | 90/10 |
| | Addition-polymerizable monomer (a2) Kind | St | St/LA = 85/15(*5) | St/LA = 75/25(*5) | St | — | St/LA = 50/50(*5) | St | MMA |
| | Amount (g) | 10 | 10 | 10 | 10 | — | 10 | 10 | 10 |
| Coalescent | Gelatin (g) | 0.05 | 0.05 | 0.05 | 0.05 | 0.05 | 0.05 | 0.05 | 0.05 |
| Releasing agent | Polyether-modified silicone (g) | 0.15 | 0.15 | 0.15 | 0.15 | 0.15 | 0.15 | 0.15 | 0.15 |
| Composition of the above aqueous dispersion of resin for thermal transfer image-receiving sheets | Polyester resin (a1) | 1f | 1a | 1a | 1g | 1a | 1a | 1h | 1a |
| | Aqueous dispersion of polyester resin (a1) | 1-(vii) | 1-(xi) | 1-(vi) | 1-(viii) | 1-(i) | 1-(ix) | 1-(x) | 1-(i) |
| | Molar ratio of BPA-PO (in alcohol component) | 60 | 100 | 100 | 100 | 100 | 100 | 40 | 100 |
| | Molar ratio of fumaric acid (in carboxylic acid component) | 20 | 20 | 20 | 0 | 20 | 20 | 20 | 20 |
| | Carboxylic acid other than fumaric acid | IPA | IPA | IPA | cHxDA | IPA | IPA | IPA | IPA |
| | Acid value (mgKOH/g) | 31 | 23 | 23 | 24 | 23 | 23 | 27 | 23 |
| Evaluation | Releasability under high-temperature and high-humidity conditions (black solid image printing) | B | A | A | C | C | C | D | D |
| | Releasability (black solid image printing) | A | AA | AA | B | B | A | A | D |
| | Dyeability (maximum density) | 1.82 | 1.95 | 1.80 | 1.56 | 1.50 | 1.83 | 1.69 | Not releasable |

Note
(*3)"Segment (A2)/fumaric acid" represents a weight ratio of addition polymer-base resin segment (A2) to fumaric acid as a monomer of polyester resin segment (A1) in resin for thermal transfer image-receiving sheets.
(*4)"Segment (A1)/segment (A2)" represents a weight ratio of polyester resin segment (A1) to addition polymer-based resin segment (A2) in resin for thermal transfer image-receiving sheets.
(*5)Weight ratio
(*6)Aqueous dispersion 1-(i) of polyester resin (a1) produced in Production Example 109

As apparently shown in Table 4, it was recognized that all of the thermal transfer image-receiving sheets obtained in Examples 101 to 110 not only exhibited a high maximum density upon high-density printing and therefore an excellent dyeability, but also were free of heat fusion between the ink ribbon and the thermal transfer image-receiving sheet upon continuous black solid image printing and therefore exhibited an excellent releasability, as compared to the thermal transfer image-receiving sheets obtained in Comparative Examples 101 to 105.

In particular, the followings are recognized from Table 4.
[1] When the polyester resin (a1) constituting the polyester resin segment (A1) had no non-aromatic carbon-to-carbon unsaturated bond, and the addition polymer-based resin segment (A2) was not present in the side chain to thereby fail to form any graft polymer, the resulting thermal transfer image-receiving sheet using such a polyester resin (a1) was deteriorated in both releasability and dyeability (Comparative Example 101).

[2] When the resin for thermal transfer image-receiving sheets contained no graft polymer having the addition polymer-based resin segment (A2), the resulting thermal transfer image-receiving sheet was deteriorated in both releasability and dyeability (Comparative Example 102).

[3] When the addition polymer-based resin segment (A2) contained no constitutional unit derived from the aromatic group-containing addition-polymerizable monomer, the resulting thermal transfer image-receiving sheet suffered from heat fusion with the ink ribbon upon printing, and was unable to be released therefrom (Comparative Example 105).

[4] The thermal transfer image-receiving sheet in which the addition polymer-based resin segment (A2) contained a constitutional unit derived from the aromatic group-containing addition-polymerizable monomer in an amount of 85% by weight or more was enhanced in releasability (comparison among Example 110, Reference Example 101, and Comparative Example 103).

[5] The thermal transfer image-receiving sheet in which the polyester resin segment (A1) contained an alkyleneoxide adduct of 2,2-bis(4-hydroxyphenyl)propane in an amount of 60 mol % or more was enhanced in releasability (comparison between Example 109 and Comparative Example 104).

Production Examples 201 and 202

Production of Polyester Resins (a1)-2a and (a1)-2b

The monomers of a polyester resin (a1) except for fumaric acid as shown in Table 5, and tin (II) dioctylate were charged into a 5-L four-necked flask equipped with a thermometer, a stainless steel stirring bar, a falling type condenser and a nitrogen inlet tube. The contents of the flask were reacted in a mantle heater in a nitrogen atmosphere at 235° C. for 5 hours, and further reacted under reduced pressure (8.3 kPa) for 1 hour. Next, fumaric acid and 4-t-butyl catechol were added to the flask at 210° C., and the resulting mixture was reacted for 5 hours, and then further reacted under reduced pressure (20 kPa) until a softening point of the reaction product reached the temperature shown in Table 5 as measured according to ASTM D36-86, thereby obtaining polyester resins (a1)-2a and (a1)-2b.

The properties of the thus obtained respective polyester resins (a1)-2a and (a1)-2b were measured by the above methods. The results are shown in Table 5.

TABLE 5

| | | | Production Examples | |
|---|---|---|---|---|
| | | | 201 | 202 |
| Polyester resin (a1) | | | 2a | 2b |
| Monomers | Alcohol component (g) | BPA-PO(*7) | 6,883 (100) | 3,390 (100) |
| | Carboxylic acid component (g) | Isophthalic acid | 2,775 (85) | — |
| | | 1,4-Cyclohexane-dicarboxylic acid | — | 1,384 (83) |
| | | Fumaric acid | 342 (15) | 225 (20) |
| Radical polymerization inhibitor | 4-t-Butyl catechol (g) | | 5 | 2.5 |
| Catalyst | Tin (II) dioctylate (g) | | 50 | 25 |
| Properties of polyester resin (a1) | Softening point (° C.) | | 113 | 96 |
| | Glass transition temperature (° C.) | | 67 | 57 |
| | Acid value (mgKOH/g) | | 17 | 24 |
| | Number-average molecular weight | | 3,800 | 3,600 |

Note
The numerals in parentheses each represent a molar ratio based on 100 mol as a total amount of alcohol component.
(*7)Polyoxypropylene (2.2)-2,2-bis(4-hydroxyphenyl)propane (molar number of addition of polyoxypropylene: 2.2 mol)

Production Examples 203 and 204

Production of Aqueous Dispersions 2-(i) and 2-(ii) of Polyester Resins (a1)-2a and (a1)-2b Step (1)
A 10-L four-necked flask equipped with a nitrogen inlet tube, a reflux condenser, a stirrer and a thermocouple was charged with the respective polyester resins (a1)-2a and (a1)-2b with the formulations as shown in Table 6, and the contents of the flask were dissolved in methyl ethyl ketone at 25° C. Next, a 25% ammonia aqueous solution was added to the resulting solution, and then deionized water was added thereto while stirring. The resulting mixture was placed under reduced pressure at 60° C. to remove methyl ethyl ketone therefrom, cooled to room temperature and then filtered through a 200-mesh screen, thereby obtaining aqueous dispersions 2-(i) and 2-(ii) of the respective polyester resins (a1).

The properties of the thus obtained respective aqueous dispersions 2-(i) and 2-(ii) were measured by the above methods. The results are shown in Table 6.

TABLE 6

| | | Production Examples | |
|---|---|---|---|
| | | 203 | 204 |
| Aqueous dispersion of polyester resin (a1) | | 2-(i) | 2-(ii) |
| Polyester resin (a1) | Kind | 2a | 2b |
| | Amount (g) | 2,500 | 2,500 |
| Methyl ethyl ketone (g) | | 2,500 | 2,500 |
| 25% Ammonia aqueous solution (g) | | 35 | 72 |
| Deionized water (g) | | 5,830 | 5,830 |
| Properties of aqueous dispersion of polyester resin (a1) | Volume-median particle size (nm) | 111 | 160 |
| | Solid content (wt %) | 37 | 38 |
| | pH | 6.7 | 7.7 |

Production Examples 205 to 208

Production of Aqueous Dispersions 2-(I) to 2-(IV) of Resin for Thermal Transfer Image-Receiving Sheets Step (2)
A 2-L four-necked flask equipped with a nitrogen inlet tube, a reflux condenser, a dropping funnel, a stirrer and a thermocouple was charged with the respective polyester dispersions, deionized water and styrene as the addition-polymerizable monomer (a2) with the formulations as shown in Table 7, followed by stirring the contents of the flask for 30 minutes. Then, the contents of the flask were mixed with sodium persulfate under a nitrogen gas flow, and reacted at 90° C. for 6 hours. The resulting reaction mixture was cooled to room temperature and then filtered through a 200-mesh screen, thereby obtaining aqueous dispersions 2-(I) to 2-(IV) of the resin for thermal transfer image-receiving sheets containing a crosslinked graft polymer (P1). Meanwhile, the amounts of the respective materials compounded were determined such that the weight ratio between the polyester resin segment (A1) and the addition polymer-based resin segment (A2) in the resin for thermal transfer image-receiving sheets contained in the resulting respective aqueous dispersions was adjusted as shown in Table 7.

The properties of the thus obtained respective aqueous dispersions 2-(I) to 2-(IV) were measured by the above methods. The results are shown in Table 7.

TABLE 7

|  |  | Production Examples | | | |
|---|---|---|---|---|---|
|  |  | 205 | 206 | 207 | 208 |
| Aqueous dispersion of resin for thermal transfer image-receiving sheets | | 2-(I) | 2-(II) | 2-(III) | 2-(IV) |
| Aqueous dispersion of polyester resin (a1) | Kind | 2-(i) | 2-(i) | 2-(i) | 2-(ii) |
|  | Amount (g) | 973 | 865 | 757 | 950 |
| Deionized water (g) | | — | 55 | 123 | 10 |
| Addition-polymerizable monomer (a2) | Styrene (g) | 40 | 80 | 120 | 40 |
| Sodium persulfate (g) | | 0.16 | 0.31 | 0.47 | 0.16 |
| Segment (A1)/segment (A2)(*8) (weight ratio) | | 90/10 | 80/20 | 70/30 | 90/10 |
| Properties of aqueous dispersion of resin for thermal transfer image-receiving sheets | Volume-median particle size (nm) | 111 | 147 | 150 | 150 |
|  | Solid content (wt %) | 40 | 40 | 40 | 39 |
|  | pH | 6.4 | 6.1 | 6.1 | 7.3 |
|  | Methyl ethyl ketone-insoluble content (%) | 62 | 74 | 81 | 60 |
|  | Methyl ethyl ketone swelling rate (%) | 190 | 212 | 253 | 185 |

Note
(*8)The weight ratio [(A1)/(A2)] represents a weight ratio of polyester resin segment (A1) to addition polymer-based resin segment (A2) in resin for thermal transfer image-receiving sheets.

Examples 201 to 204

Production of Thermal Transfer Image-Receiving Sheets

The respective components as shown in Table 8 were mixed with each other at 45° C. with the formulations as shown in Table 8 to prepare respective intermediate layer coating solutions. The thus prepared coating solutions were respectively applied onto a synthetic paper "YUPO FGS-250" (tradename; available from Yupo Corporation; thickness: 250 µm; basis weight: 200 g/m²) using a wire bar such that a coating amount thereof after dried was 20.0 g/m², and then dried at 25° C. for 5 minutes, thereby obtaining intermediate layer-coated sheets.

Meanwhile, upon preparation of each intermediate layer, as the hollow particles, there were used those particles composed of the following styrene-acryl copolymer and the following gelatin as a binder.

Styrene-acryl copolymer: "Nipol MH8101" (tradename) available from Zeon Corporation; hollowness rate: 50%; solid content: 26% by weight Gelatin: "G0723K" (tradename) available from Nitta Gelatin Inc.; viscosity: 4.4 mPa·s Next, the respective components as shown in Table 8 were mixed with each other at 25° C. with the formulations as shown in Table 8 to prepare dye receiving layer coating solutions A2 to D2. Meanwhile, the solid content of the aqueous dispersion of the resin for thermal transfer image-receiving sheets used for preparing the respective dye receiving layer coating solutions was adjusted to 30% by weight. In addition, upon preparation of each dye receiving layer coating solution, the following gelatin was used as a coalescent, and the following polyether-modified silicone was used as a releasing agent.

Gelatin: "G0723K" (tradename) available from Nitta Gelatin Inc.; viscosity: 4.4 mPa·s Polyether-modified silicone: "KF-615A" (tradename) available from Shin-Etsu Chemical Co., Ltd.

The thus prepared dye receiving layer coating solutions were respectively applied onto the intermediate layer-coated sheet using a wire bar such that a coating amount thereof after dried was 5.0 g/m², and then dried at 50° C. for 2 minutes, thereby obtaining thermal transfer image-receiving sheets.

TABLE 8

|  |  | Examples | | | |
|---|---|---|---|---|---|
|  |  | 201 | 202 | 203 | 204 |
| Intermediate layer coating solution | | | | | |
| Hollow particles | Styrene-acryl copolymer (g) | 24 | 24 | 24 | 24 |
| Binder | Gelatin (g) | 1.4 | 1.4 | 1.4 | 1.4 |
| Water | Deionized water (g) | 12.6 | 12.6 | 12.6 | 12.6 |
| Dye receiving layer coating solution | | | | | |
| Dye receiving layer coating solution | | A2 | B2 | C2 | D2 |
| Aqueous dispersion of resin for thermal transfer image-receiving sheets | Production Example No. | Pro. Ex. 205 | Pro. Ex. 206 | Pro. Ex. 207 | Pro. Ex. 208 |
|  | Aqueous dispersion of resin for thermal transfer image-receiving sheets | 2-(I) | 2-(II) | 2-(III) | 2-(IV) |
|  | Kind of graft polymer | P1 | P1 | P1 | P1 |
|  | Segment (A2)/fumaric acid(*9) (weight ratio) | 2.2/1 | 5.0/1 | 8.6/1 | 2.5/1 |
|  | Segment (A1)/segment (A2)(*10) (weight ratio) | 90/10 | 80/20 | 70/30 | 90/10 |

TABLE 8-continued

|  |  | Examples | | | |
| --- | --- | --- | --- | --- | --- |
|  |  | 201 | 202 | 203 | 204 |
| Coalescent | Gelatin (g) | 0.05 | 0.05 | 0.05 | 0.05 |
| Releasing agent | Polyether-modified silicone (g) | 0.15 | 0.15 | 0.15 | 0.15 |
| Evaluation of thermal transfer image-receiving sheet | Dyeability | 1.97 | 1.93 | 1.91 | 1.85 |
|  | Releasability | AA | AA | AA | A |
|  | Releasability under high-temperature and high-humidity conditions | A | AA | AA | B |

Note
(*9)"Segment (A2)/fumaric acid" represents a weight ratio of addition polymer-based resin segment (A2) to fumaric acid as a monomer of polyester resin segment (A1) in resin for thermal transfer image-receiving sheets.
(*10)"Segment (A1)/segment (A2)" represents a weight ratio of polyester resin segment (A1) to addition polymer-based resin segment (A2) in resin for thermal transfer image-receiving sheets.

As apparently shown in Table 8, it was recognized that all of the thermal transfer image-receiving sheets obtained in Examples 201 to 204 not only exhibited a high maximum density upon high-density printing and therefore an excellent dyeability, but also were free of heat fusion between the ink ribbon and the thermal transfer image-receiving sheet upon continuous black solid image printing and therefore exhibited an excellent releasability.

Production Example 301

Production of Polyester Resin (a1)-3a

The polyester resin (a1)-3a was produced in the same manner as in Production Example 101. That is, the polyester resin (a1)-3a had the same composition and properties as those of the polyester resin (a1)-1a.

Production Examples 302 to 306

Production of Aqueous Dispersions 3-(i) to 3-(v) Containing Respective Polyester Resins (a1)

A 10-L four-necked flask equipped with a nitrogen inlet tube, a reflux condenser, a stirrer and a thermocouple was charged with the respective polyester resins (a1) and the compound (B) with the formulations as shown in Table 9, and the contents of the flask were dissolved in methyl ethyl ketone at 25° C. Next, a 25% ammonia aqueous solution was added to the resulting solution, and then deionized water was added thereto while stirring. The resulting mixture was placed under reduced pressure at 60° C. to remove methyl ethyl ketone therefrom, cooled to room temperature and then filtered through a 200-mesh screen, thereby obtaining aqueous dispersions 3-(i) to 3-(v) containing the respective polyester resins (a1). Meanwhile, polyoxyethylene bisphenol A lauric acid ester ("EXCEPARL BP-DL" (tradename) available from Kao Corporation) used as the compound (B) contained a 2,2-bis(4-hydroxyphenyl)propane moiety in its structure, and had a melting point of −2° C. and a viscosity of 350 mPa·s as measured at 30° C.

The properties of the thus obtained respective aqueous dispersions 3-(i) to 3-(v) were measured by the above methods. The results are shown in Table 9.

TABLE 9

|  |  | Production Examples | | | | |
| --- | --- | --- | --- | --- | --- | --- |
|  |  | 302 | 303 | 304 | 305 | 306 |
| Aqueous dispersion containing a polyester resin (a1) |  | 3-(i) | 3-(ii) | 3-(iii) | 3-(iv) | 3-(v) |
| Polyester resin (a1) | Kind | 3a | 3a | 3a | 3a | 3a |
|  | Amount (g) | 2,500 | 2,500 | 2,500 | 2,500 | 2,500 |
| Plasticizer (compound (B)) | Kind | ** | ** | ** | ** | — |
|  | Amount (g) | 250 | 500 | 750 | 1,000 | — |
| Methyl ethyl ketone (g) |  | 2,500 | 2,500 | 2,500 | 2,500 | 2,500 |
| 25% Ammonia aqueous solution (g) |  | 45 | 45 | 45 | 45 | 45 |
| Deionized water (g) |  | 5,830 | 5,830 | 5,830 | 5,830 | 5,830 |
| Resin (A)/compound (B)(*11) (weight ratio) |  | 100/10 | 100/20 | 100/30 | 100/40 | 100/0 |
| Properties of aqueous dispersion containing a polyester resin (a1) | Volume-median particle size (nm) | 100 | 100 | 100 | 130 | 130 |
|  | Solid content (wt %) | 43 | 40 | 46 | 49 | 35 |
|  | pH | 7.1 | 7.1 | 7.1 | 7.1 | 7.0 |

Note
(*11)"Resin (A)/compound (B)" represents a weight ratio of resin (A) to compound (B) in resin composition for thermal transfer image-receiving sheets.
** Polyoxyethylene bisphenol A lauric acid diester

Production Examples 307 to 311

Production of Aqueous Dispersions 3-(I) to 3-(V) of Respective Resin Compositions for Thermal Transfer Image-Receiving Sheets A 2-L four-necked flask equipped with a nitrogen inlet tube, a reflux condenser, a dropping funnel, a stirrer and a thermocouple was charged with the aqueous dispersion of the respective polyester resins (a1), deionized water and styrene as the addition-polymerizable monomer (a2) with the formulations as shown in Table 10, followed by stirring the contents of the flask for 30 minutes. Then, the contents of the flask were mixed with sodium persulfate under a nitrogen gas flow, and reacted at 80° C. for 6 hours. The resulting reaction mixture was cooled to room temperature and then filtered through a 200-mesh screen, thereby obtaining aqueous dispersions 3-(I) to 3-(V) of the respective resin compositions for thermal transfer image-receiving sheets. Meanwhile, the amounts of the respective materials compounded were determined such that the weight ratio between the polyester resin segment (A1) and the addition polymer-based resin segment (A2) in the resin for thermal transfer image-receiving sheets contained in the respective aqueous dispersions was adjusted as shown in Table 10.

The properties of the thus obtained respective aqueous dispersions 3-(I) to 3-(V) were measured by the above methods. The results are shown in Table 10.

respectively applied onto a synthetic paper "YUPO FGS-250" (tradename; available from Yupo Corporation; thickness: 250 μm; basis weight: 200 g/m$^2$) using a wire bar such that a coating amount thereof after dried was 20.0 g/m$^2$, and then dried at 25° C. for 5 minutes, thereby obtaining intermediate layer-coated sheets.

Meanwhile, upon preparation of each intermediate layer, as the hollow particles, there were used those particles composed of the following styrene-acryl copolymer and the following gelatin as a binder.

Styrene-acryl copolymer: "Nipol MH8101" (tradename) available from Zeon Corporation; hollowness rate: 50%; solid content: 26% by weight Gelatin: "G0723K" (tradename) available from Nitta Gelatin Inc.; viscosity: 4.4 mPa·s Next, the respective components as shown in Table 11 were mixed with each other at 25° C. with the formulations as shown in Table 11 to prepare dye receiving layer coating solutions A3 to E3. Meanwhile, the solid content of the aqueous dispersion of the resin for thermal transfer image-receiving sheets used for preparing the respective dye receiving layer coating solutions was adjusted to 30% by weight. In addition, upon preparation of each dye receiving layer coating solution, the following gelatin was used as a coalescent, and the following polyether-modified silicone was used as a releasing agent.

Gelatin: "G0723K" (tradename) available from Nitta Gelatin Inc.; viscosity: 4.4 mPa·s

TABLE 10

| | | Production Examples | | | | |
|---|---|---|---|---|---|---|
| | | 307 | 308 | 309 | 310 | 311 |
| Aqueous dispersion of resin composition for thermal transfer image-receiving sheets | | 3-(I) | 3-(II) | 3-(III) | 3-(IV) | 3-(V) |
| Aqueous dispersion containing a polyester resin (a1) | Kind | 3-(i) | 3-(ii) | 3-(iii) | 3-(iv) | 3-(v) |
| | Amount (g) | 859 | 911 | 432 | 407 | 897 |
| Deionized water (g) | | 243 | 191 | 180 | 205 | 205 |
| Addition-polymerizable monomer (a2) | Styrene (g) | 40 | 40 | 22 | 22 | 40 |
| Sodium persulfate (g) | | 0.32 | 0.32 | 0.18 | 0.18 | 0.32 |
| Segment (A1)/segment (A2)(*12) (weight ratio) | | 89/11 | 88/12 | 87/13 | 87/13 | 90/10 |
| Properties of aqueous dispersion of resin composition for thermal transfer image-receiving sheets | Volume-median particle size (nm) | 100 | 90 | 100 | 110 | 100 |
| | Solid content (wt %) | 35 | 35 | 35 | 35 | 35 |
| | pH | 6.5 | 6.7 | 6.5 | 6.5 | 6.5 |

Note
(*12)"Segment (A1)/segment (A2)" represents a weight ratio of polyester resin segment (A1) to addition polymer-based resin segment (A2) in resin (A).

Examples 301 to 304 and Reference Example 301

Production of Thermal Transfer Image-Receiving Sheets

First, the respective components as shown in Table 11 were mixed with each other at 45° C. with the formulations as shown in Table 11 to prepare respective intermediate layer coating solutions. The thus prepared coating solutions were Polyether-modified silicone: "KF-615A" (tradename) available from Shin-Etsu Chemical Co., Ltd.

The thus prepared dye receiving layer coating solutions were respectively applied onto the intermediate layer-coated sheet using a wire bar such that a coating amount thereof after dried was 5.0 g/m$^2$, and then dried at 50° C. for 2 minutes, thereby obtaining thermal transfer image-receiving sheets.

TABLE 11

|  |  | Examples | | | | Reference |
| --- | --- | --- | --- | --- | --- | --- |
|  |  | 301 | 302 | 303 | 304 | Example 301 |
| Intermediate layer coating solution | | | | | | |
| Hollow particles | Styrene-acryl copolymer (g) | 24 | 24 | 24 | 24 | 24 |
| Binder | Gelatin (g) | 1.4 | 1.4 | 1.4 | 1.4 | 1.4 |
| Water | Deionized water (g) | 12.6 | 12.6 | 12.6 | 12.6 | 12.6 |
| Dye receiving layer coating solution | | | | | | |
| Dye receiving layer coating solution | | A3 | B3 | C3 | D3 | E3 |
| Aqueous dispersion of resin composition for thermal transfer image-receiving sheets | Production Example No. | Pro. Ex. 310 3-(I) | Pro. Ex. 311 3-(II) | Pro. Ex. 312 3-(III) | Pro. Ex. 313 3-(IV) | Pro. Ex. 314 3-(V) |
| | Aqueous dispersion of resin composition for thermal transfer image-receiving sheets | | | | | |
| | Resin (A)/compound (B)(*13) (weight ratio) | 100/9 | 100/18 | 100/26 | 100/35 | 100/0 |
| | Addition-polymerizable monomer (a2) | St | St | St | St | St |
| | Segment (A1)/segment (A2)(*14) (weight ratio) | 89/11 | 88/12 | 87/13 | 87/13 | 90/10 |
| Coalescent | Gelatin (g) | 0.05 | 0.05 | 0.05 | 0.05 | 0.05 |
| Releasing agent | Polyether-modified silicone (g) | 0.15 | 0.15 | 0.15 | 0.15 | 0.15 |
| Evaluation of thermal transfer image-receiving sheet | Dyeability | 2.03 | 1.92 | 1.93 | 1.88 | 1.96 |
| | Light fastness | 43 | 38 | 39 | 43 | 74 |

Note
(*13)"Resin (A)/compound (B)" represents a weight ratio of resin (A) to compound (B) in resin composition for thermal transfer image-receiving sheets.
(*14)"Segment (A1)/segment (A2)" represents a weight ratio of polyester resin segment (A1) to addition polymer-based resin segment (A2) in resin composition for thermal transfer image-receiving sheets.

As apparently shown in Table 11, it was recognized that all of the thermal transfer image-receiving sheets obtained in Examples 301 to 304 not only exhibited a high maximum density upon high-density printing and therefore an excellent dyeability, but also had a less change in hue owing to exposure to light and therefore exhibited an excellent light fastness.

INDUSTRIAL APPLICABILITY

The thermal transfer image-receiving sheet of the present invention is excellent in all of dyeability and releasability, in particular, releasability under high-temperature and high-humidity conditions, and can be therefore suitably used as a thermal transfer image-receiving sheet.

In addition, the thermal transfer image-receiving sheet of the present invention is excellent in dyeability and light fastness, and can be therefore suitably used as a thermal transfer image-receiving sheet.

The invention claimed is:

1. A thermal transfer image-receiving sheet comprising a substrate and a dye receiving layer which comprises a resin (A) comprising a graft polymer having a main chain segment (A1) formed of a polyester resin having an acid value of from 5 to 40 mgKOH/g and a side chain segment (A2) formed of an addition polymer-based resin,
    wherein the segment (A1) is obtained by polycondensing an alcohol component comprising an alkyleneoxide adduct of 2,2-bis(4-hydroxyphenyl)propane in an amount of 60 mol % or more with a carboxylic acid component, and the segment (A2) comprises, in reacted form, an aromatic group containing addition-polymerizable monomer in an amount of 85% by weight or more.

2. The thermal transfer image-receiving sheet according to claim 1, wherein a weight ratio of the segment (A1) to the segment (A2), segment (A1)/segment (A2), is from 55/45 to 95/5.

3. The thermal transfer image-receiving sheet according to claim 1, wherein the aromatic group-containing addition-polymerizable monomer is at least one monomer selected from the group consisting of styrene, methyl styrene, benzyl methacrylate and benzyl acrylate.

4. The thermal transfer image-receiving sheet according to claim 1, wherein a monomer from which a constitutional unit of the segment (A1) is derived, is at least one monomer selected from the group consisting of an unsaturated aliphatic carboxylic acid, an unsaturated alicyclic carboxylic acid and an unsaturated aliphatic alcohol.

5. The thermal transfer image-receiving sheet according to claim 4, wherein a content of the unsaturated aliphatic carboxylic acid, the unsaturated alicyclic carboxylic acid, or both, as the monomer is from 5 to 30 mol % on the basis of the carboxylic acid component for the segment (A1).

6. The thermal transfer image-receiving sheet according to claim 4, wherein the unsaturated aliphatic carboxylic acid is at least one carboxylic acid selected from the group consisting of fumaric acid, maleic acid and tetrahydrophthalic acid.

7. The thermal transfer image-receiving sheet according to claim 4, wherein a weight ratio of the segment (A2) to a sum of the unsaturated aliphatic carboxylic acid, the unsaturated alicyclic carboxylic acid and the unsaturated aliphatic alcohol as the monomers for the segment (A1), segment (A2)/sum of the above unsaturated group-containing components for segment (A1), is from 1/1 to 15/1.

8. The thermal transfer image-receiving sheet according to claim 1, wherein the graft polymer is a crosslinked graft polymer, and the crosslinked graft polymer contains a methyl ethyl ketone-insoluble component in an amount of from 50 to 85% by weight.

9. The thermal transfer image-receiving sheet according to claim 8, wherein the crosslinked graft polymer has a rate of swelling with methyl ethyl ketone of from 170 to 300% by weight.

10. The thermal transfer image-receiving sheet according to claim 1, wherein the dye receiving layer further comprises a compound (B) comprising a 2,2-bis(4-hydroxyphenyl)propane moiety and having a melting point of lower than 30° C.

11. The thermal transfer image-receiving sheet according to claim 10, wherein a weight ratio of the resin (A) to the compound (B), resin (A)/compound (B), is from 100/5 to 100/40.

12. The thermal transfer image-receiving sheet according to claim 1, further comprising an intermediate layer comprising a water-soluble polymer and hollow particles between a substrate and the dye receiving layer.

13. A method for producing the thermal transfer image-receiving sheet as defined in claim 1, comprising:
polycondensing the alcohol component comprising an alkyleneoxide adduct of 2,2-bis(4-hydroxyphenyl)propane in an amount of 60 mol % or more with the carboxylic acid component to prepare a polyester resin (a1) comprising a non-aromatic carbon-to-carbon unsaturated bond and having an acid value of from 5 to 40 mgKOH/g, and then mixing the polyester resin (a1) with an aqueous medium to obtain an aqueous dispersion of the polyester resin (a1); and adding an addition-polymerizable monomer (a2) to the aqueous dispersion obtained in said polycondensing to polymerize the monomer (a2) with the polyester resin (a1), thereby obtaining an aqueous dispersion of the graft polymer; and applying the aqueous dispersion of the graft polymer to a substrate to form a dye receiving layer.

14. The method for producing the thermal transfer image-receiving sheet according to claim 13, wherein said polycondensing comprises dissolving the polyester resin (a1) in a ketone-based solvent, adding a neutralizing agent to the resulting solution, and then adding water to the solution to convert the solution into a water phase.

15. The method for producing the thermal transfer image-receiving sheet according to claim 13, wherein said polycondensing comprises mixing the polyester resin (a1), the compound (B) and the aqueous medium.

\* \* \* \* \*